(12) United States Patent
Oouchi et al.

(10) Patent No.: US 7,545,798 B2
(45) Date of Patent: Jun. 9, 2009

(54) COMMUNICATION SYSTEM FOR CONTROLLING A CALL PORTION

(75) Inventors: Makoto Oouchi, Fukushima (JP); Sakae Nagayama, Fukushima (JP)

(73) Assignee: Hitachi Communication Technologies Ltd., Tokyo (JP)

( * ) Notice: Subject to any disclaimer, the term of this patent is extended or adjusted under 35 U.S.C. 154(b) by 1001 days.

(21) Appl. No.: 10/942,886

(22) Filed: Sep. 17, 2004

(65) Prior Publication Data
US 2005/0100002 A1 May 12, 2005

(30) Foreign Application Priority Data
Sep. 19, 2003 (JP) ............................. 2003-328951

(51) Int. Cl.
*H04L 12/28* (2006.01)
(52) U.S. Cl. ...................... 370/351; 370/401; 370/409
(58) Field of Classification Search ................. 370/352, 370/401; 379/166; 709/232
See application file for complete search history.

(56) References Cited

U.S. PATENT DOCUMENTS

2001/0004361 A1 6/2001 Kobayashi
2002/0071424 A1* 6/2002 Chiu et al. .................. 370/352

* cited by examiner

*Primary Examiner*—Fan Tsang
*Assistant Examiner*—Simon King
(74) *Attorney, Agent, or Firm*—Antonelli, Terry, Stout & Kraus, LLP.

(57) ABSTRACT

To provide a communication apparatus which is used in a VoIP telephone system and which can make connections with the minimum partners even in case an access cannot be made to a server managing a call connection. In case a call control unit 401 of a communication apparatus 4 acquires a telephone number by a call-initiate and requests the communication connection with a communication partner apparatus corresponding to said telephone number for the server, the call control unit 401 requests a communication connection addressed to an IP address corresponding to said telephone number, when no response is obtained from said server and when the IP address corresponding to said telephone number is stored in a correspondence storage unit 403b, so that the call control unit 401 performs a call connection processing directly with the connection partner thereby to make a communication connection by the VoIP.

10 Claims, 16 Drawing Sheets

FIG. 3

| CA (403a-1) | CA IP ADDRESS (403a-2) |
|---|---|
| No.1 | IP Add 71 |
| No.2 | — |

| TELEPHONE NUMBER (SELECTED INFORMATION) 403b-1 | CA IP ADDRESS 403b-2 |
|---|---|
| TEL No.52 | IP Add 42 |
|  | — |
|  | — |
|  | — |

403b1

| TELEPHONE NUMBER (SELECTED INFORMATION) | CA IP ADDRESS |
|---|---|
| TEL No.62 | IP Add 62 |
|  | — |
|  | — |
|  | — |

403b2

| TELEPHONE NUMBER (SELECTED INFORMATION) | CA IP ADDRESS |
|---|---|
| TEL No.53 | IP Add 43 |
|  | IP Add 44 |
|  | IP Add 45 |
|  | IP Add 46 |

403b3

⋮

| TELEPHONE NUMBER (SELECTED INFORMATION) | CA IP ADDRESS |
|---|---|
|  |  |
|  |  |
|  |  |
|  |  |

| CA | CA IP ADDRESS |
|---|---|
| No.1 | IP Add 71 |
| No.2 | — |

FIG. 7

| TELEPHONE NUMBER (SELECTED INFORMATION) 603b-1 | CORRESPONDING IP ADDRESS 603b-2 |
|---|---|
| TEL No.52 | IP Add 42 |
| TEL No.62 | IP Add 62 |
| TEL No.53 | IP Add 45 |
| ⋮ | ⋮ |

| TELEPHONE NUMBER (SELECTED INFORMATION) 703-1 | CORRESPONDING IP ADDRESS 703-2 |
|---|---|
| TEL No.51 | IP Add 41 |
| TEL No.61 | IP Add 61 |
| TEL No.52 | IP Add 42 |
| TEL No.62 | IP Add 62 |
| TEL No.53 | IP Add 43 |
| TEL No.53 | IP Add 44 |
| TEL No.53 | IP Add 45 |
| TEL No.53 | IP Add 46 |
| ⋮ | ⋮ |

| CA | CA IP ADDRESS |
|---|---|
| No.1 | IP Add 72 |
| No.2 | IP Add 73 |

403a-1, 403a-2, 403a

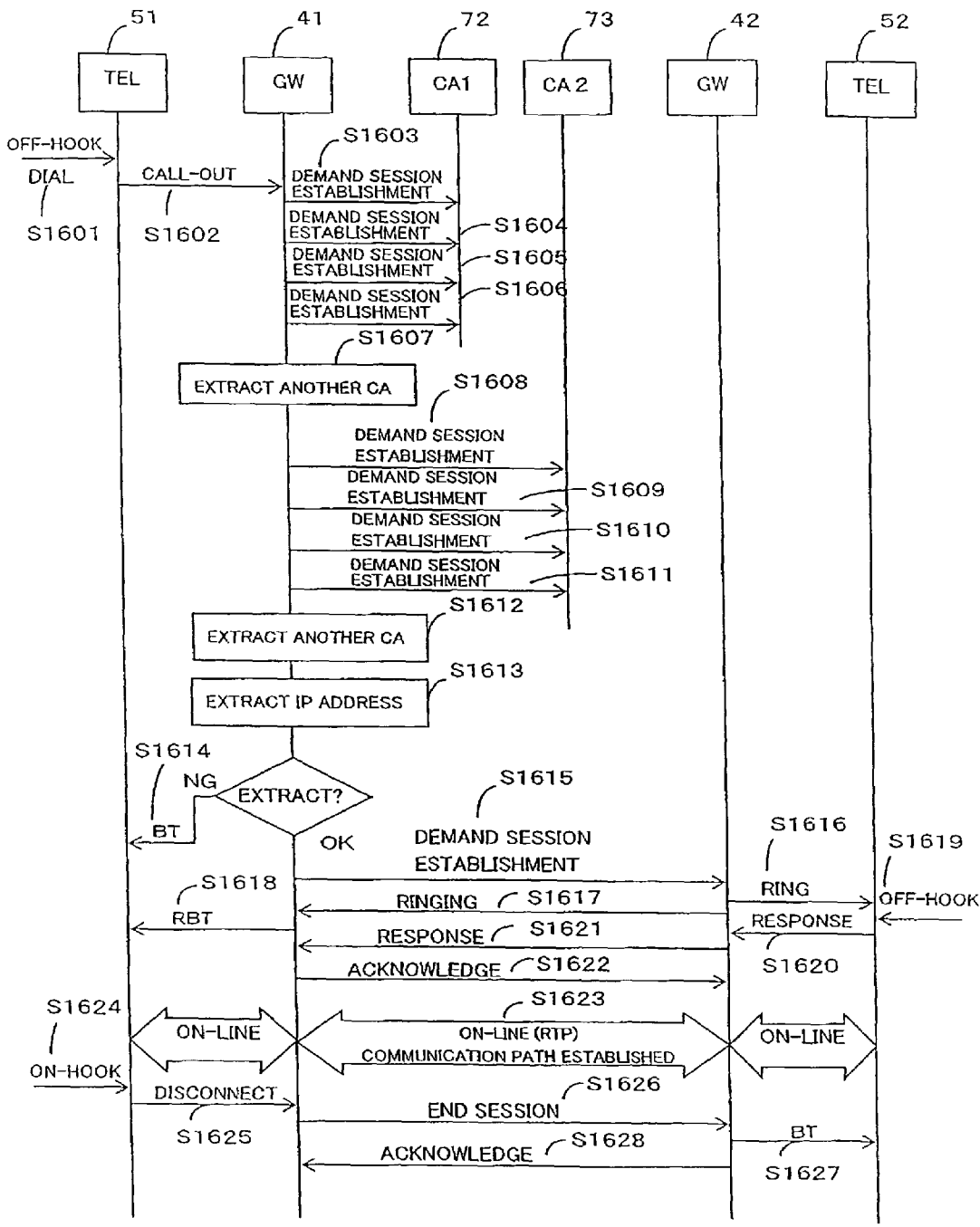

COMMUNICATION SYSTEM FOR CONTROLLING A CALL PORTION

BACKGROUND OF THE INVENTION

The present invention relates to a communication apparatus which is provided with a call control function (e.g., the call control function of VoIP (Voice over Internet Protocol) to realize voice communications through a computer communication network such as IP (Internet Protocol) network.

There has been proposed the VoIP communication system which realizes the voice communications through the IP network such as an internet telephone system.

In the VoIP communication system described in Japanese Patent Laid-open Publication No. 2003-18182, for example, either the VoIP communication apparatus accommodating a voice communication apparatus on a call-initiate side or an IP telephone set on a call-initiate side converts the call originating telephone number into an IP address, and transfers a call control messages using an IF packet with either a VoIP communication apparatus accommodating a voice communication apparatus on a call-present side having that IP address or an IP telephone set on a call-present side, so that a call is connected by performing the call controlling procedure. In another conventional VoIP communication system, on the other hand, a server (e.g., a call agent or a gate keeper), which manages a VoIP communication apparatus accommodating a voice communication apparatus on the call-initiate side, a VoIP communication apparatus accommodating an IP telephone set and a voice communication apparatus on a call-present side, and an IP telephone set, receives the originating telephone number of a call from that VoIP communication apparatus and converts that telephone number into an IP address, and exchanges the call control messages using the IP packet, with either the VoIP communication apparatus accommodating the voice communication apparatus having that IP address on the call-present side or the IP telephone set on the call-present side, so that a call is connected by performing the call controlling procedure.

SUMMARY OF THE INVENTION

In case a system, in which a server is inquired, is adopted as the system in which an IP address corresponding to an originating telephone number of a call is to be obtained, the IP address cannot be obtained from the server due to the trouble of the server or the trouble of the lines.

In the conventional VoIP communication system, the VoIP communication apparatus accommodating the voice communication apparatus on the call-initiate side or the IP telephone set decides the disconnectability of the call and sends a disconnectability sound (or a busy tone) thereby to notify the operator of the disconnectability but does not establish the communication.

As the system for acquiring the IP address corresponding to the originating telephone number of a call, on the other hand, there is adopted a system, in which the VoIP communication apparatus accommodating the voice communication apparatus on the call-initiate side or the IP telephone set on the call-initiate side converts the originating telephone number of the call-present to the IP address by itself. In this case, a precise IP address cannot be obtained when the VoIP communication apparatus or the IP telephone set is added, when the place for installation is changed or when the configuration of the IP network is changed.

In this case, all the VoIP communication apparatuses and all the IP telephone sets have to be set with those changed contents. This necessity makes it difficult to adopt this system in a large-scale internet telephone system.

The present invention has been conceived in view of the background thus far described, and has an object to provide a communication system which makes the minimum communication connections possible even when an IP address corresponding to the originating telephone number of a call cannot be obtained from a server due to the trouble of the server or the trouble of lines, in case a communication system inquiring the server and using the server as a substitution is adopted as a system which acquires that IP address.

In order to solve the aforementioned problems, therefore, according to the present invention, there is provided a communication apparatus having a function to execute a call controlling procedure for voice communications using a computer communication network with a communication partner apparatus by using a server connected with said computer communication network, comprising:

a correspondence storage means which stores corresponding relations between a communication address of the communication partner apparatus and the selection information of said communication partner apparatus; and a call controller for receiving the selection information of said communication partner apparatus by a call-initiate, for requesting a communication connection for a communication address of said server and for performing a call connection processing with the communication partner apparatus by using said server, wherein said call controller acquires, in case the communication connection is demanded for said server but no response is obtained from said server, such the communication address of the communication partner apparatus as corresponds to said selection information stored in said correspondence storage means is obtained, and requests the communication connection for said communication address. Said selection number is telephone number and etc.

In a communication apparatus having a call controlling function (i.e., a VoIP (Voice over IP) call controlling function) which realizes voice communications through a computer communication network such as the IP (Internet Protocol) network, a VoIP communication system adopts the communication system which may not be able to obtain the IP address corresponding to the originating telephone number of a call from the server due to the trouble of the server or the trouble of lines or to make an access to the server, in case the communication system inquiring the server and using the server as the substitution is adopted as the system which acquires that IP address. Even in this case, according to the present invention, the minimum communication connections can be made to retain the communication connections with an urgent liaison or an important person, for example, even at the time of trouble of the server

BRIEF DESCRIPTION OF THE DRAWINGS

FIG. 3 is an explanatory table showing an example of the registered contents of a CA storage unit 403a shown in FIG. 2;

FIG. 4 is an explanatory table showing an example of the registered contents of a corresponding storage unit 403b shown in FIG. 2;

FIG. 6 is an explanatory table showing an example of the registered contents of a CA storage unit 603a shown in FIG. 5;

FIG. 7 is an explanatory table showing an example of the registered contents of a corresponding storage unit 603b shown in FIG. 5;

FIG. 9 is a table showing an example of the registered contents of a corresponding storage unit 703 shown in FIG. 8;

FIG. 15 is an explanatory table showing an example of the registered contents of the CA storage unit 403a, as shown in FIG. 2, in the second embodiment of the present invention; and FIG. 16 is a sequence diagram for explaining the actions of the case, in which servers 72 and 73 do not respond to the call-initiate made from the telephone set 51 to the telephone set 52 in the second embodiment of the present invention.

BEST MODE FOR CARRYING OUT THE INVENTION

The various embodiments of the present invention will be described with reference to the accompanying drawings.

At first, a first embodiment of the present invention will be described in the following.

Figure 1:
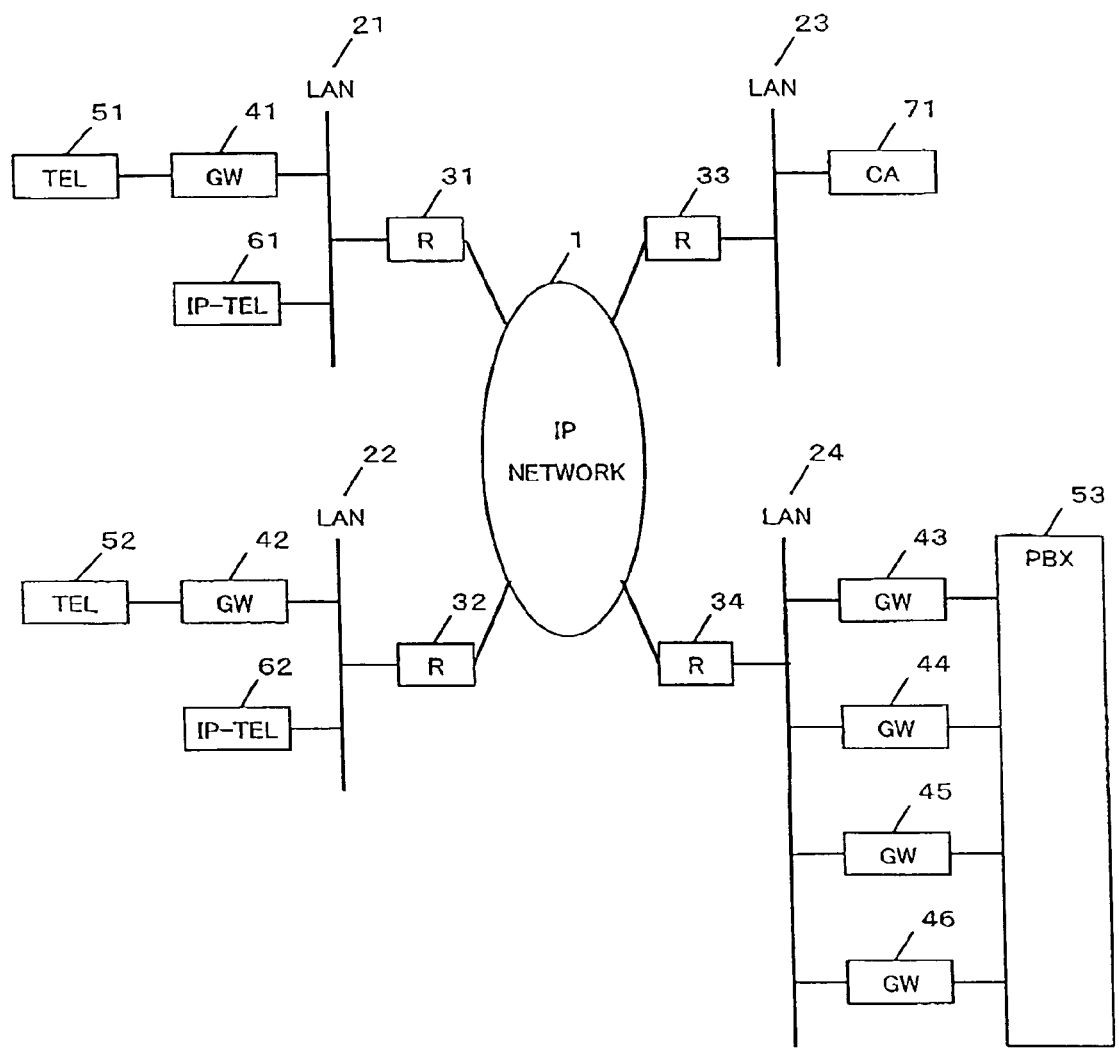
FIG. 1 is a schematic configuration diagram of a VoIP communication system, to which a first embodiment of the present invention is applied.

FIG. 1 is a schematic configuration diagram of a VoIP communication system, to which the first embodiment of the present invention is applied.

In FIG. 1, a VoIP communication apparatus (GW) 41 which connects a telephone set (TEL) 51 or a voice terminal, is connected with an IP network 1 through a LAN (Local Area Network) 21 and a router (R) 31. An IP telephone set (IP-TEL) 61 is likewise connected with the IP network 1 through the LAN 21 and the router 31. A VoIP communication apparatus (GW) 42, which connects a telephone set 52 or the voice terminal, is connected with the IP network 1 through a LAN 22 and a router 32. An IP telephone set 62 is also connected with the IP network 1 through the LAN 21 and the router 31.

VoIP communication apparatuses (GW) 43 to 46 which connects a private branch exchange (PBX) 53 or the voice terminal, are connected with the IP network 1 through a LAN 24 and a router 34. A server (e.g., CA: a call agent or a gate keeper) 71 which manages the VoIP communication apparatuses 41 to 46 and the IP telephone sets 61 and 62, is connected with the IP network 1 through a LAN 23 and a router 33.

Here, the IP address of the VoIP communication apparatus (GW) 41 is made to correspond to the telephone number of the telephone set 51 which is connected by itself. The IP address of the VoIP communication apparatus 42 is made to correspond to the telephone number of the telephone set 52 which is connected by itself. The individual IP addresses of the VoIP communication apparatuses 43 to 46 are made to correspond to the same telephone numbers (i.e., special numbers or the so-called "key numbers") of the PBX 53 which is connected by themselves.

In the configuration thus far described, the VoIP communication apparatuses (GW) 41 to 46 (as will also be shortly called the "VoIP communication apparatus 4") and the IP telephone sets 61 and 62 (as will also be shortly called the "IP telephone set 6") receive an IP packet, which includes a communication connection message for the voice communication from the IP network 1 and is addressed thereto, through the routers 31 to 34 (as will also be shortly called the "router 3"), the LANs 21 to 24 (as will also be shortly called the "LAN 2") and/or the server 71 (as will also be shortly called the "server 7"). Then, a call controlling procedure (e.g., the call controlling procedure according to the standards of: the H.323 specified in the ITU-T (International Telecommunication Union-Telecommunication Sector); or the SIP (Session Initiation Protocol) regulated by the RFC (i.e., the internet standardization specifications having been authorized by the Internet Engineering Steering Group) is performed by transmitting/receiving the communication connection message which performs the voice communication using the IP packet with either the VoIP communication apparatus 4 or the IP telephone set 6 having transmitted the IP packet. As a result, a call is connected to establish a voice communication path between either a voice terminal 5 or the IP telephone set 6 connected by itself and the voice terminal 5 or the IP telephone set 6 connected by the transmitting VoIP communication apparatus 4. Then, a speech communication is made by transmitting/receiving voice signals through the IP network 1 by the IP packet.

When the VoIP communication apparatus 4 recognizes a transmission from the voice terminal 5 connected by itself, the VoIP communication apparatus 4 performs the call controlling procedure by transmitting/receiving the communication connection message for the voice communication using the IP packet, through the LAN 2, the router 3 and the IP network 1 between itself and the VoIP communication apparatus 4 or the IP telephone set 6 having the IP address corresponding to the originating telephone number of that call. As a result, the call is connected to establish the voice communication path between the voice terminal 5 owned by the VoIP communication apparatus 4 and the voice terminal 5 or the IP telephone set 6 which is specified by the originating telephone number.

The VoIP communication apparatus 4 will be described in more detail.

Figure 2:
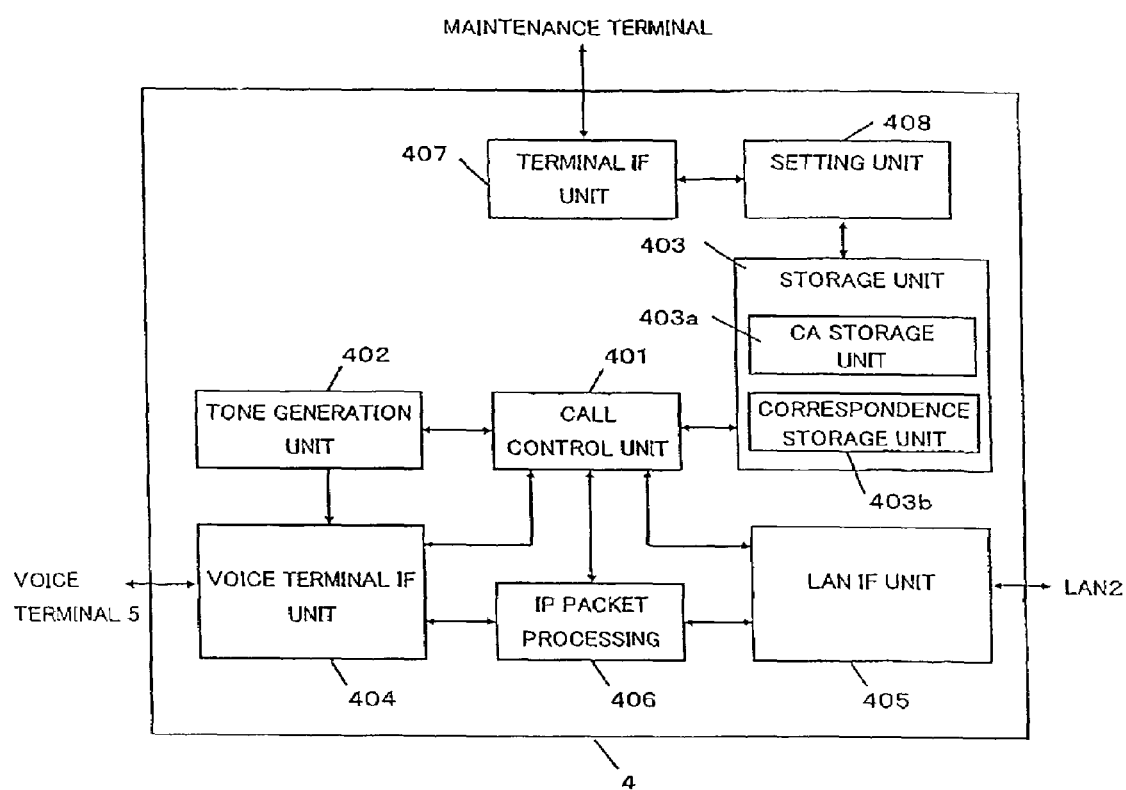
FIG. 2 is a schematic configuration diagram of one of VoIP communication apparatuses 41 or 46 shown in FIG. 1.

FIG. 2 is a schematic configuration diagram of the VoIP communication apparatus 4.

In FIG. 2, a voice terminal IF unit 404 is an interface which connects the voice terminal 5, and performs the processing according to the standards of interface specifications adopted by the voice terminal 5. As a result, the voice terminal IF unit 404 relays the voice data between the voice terminal 5 and an IP packet processing unit 406. The voice terminal IF unit 404 detects the information on the calling control sent from the voice terminal 5, and notifies a call control unit 401 of the detected information.

A LAN IF unit 405 is an interface which connects the LAN 2, and performs a processing according to the standards of the interface specifications adopted by the LAN 2. As a result, the LAN IF unit 405 relays the IP packet between the LAN 2 and the IP packet processing unit 406.

In accordance with an instruction from the call control unit 401, the IP packet processing unit 406 converts both the voice data sent from the voice terminal IF unit 404 and the communication connection message which performs the voice communication sent from the call control unit 401, into the IP packet which is addressed to the IP address notified by the call control unit 401, and sends the IP packet to the LAN IF unit 405. Moreover, the IP packet processing unit 406 extracts data from the IP packet which is sent from the LAN IF unit 405 and addressed to its own VoIP communication apparatus 4, and sends the extracted data to the voice terminal IF unit 404 or the call control unit 401 in accordance with an instruction from the call control unit 401.

A storage unit 403 includes a CA storage unit 403a and a correspondence storage unit 403b. As shown in FIG. 3, the CA storage unit 403a is set and stored with an IP address 903a-2 corresponding to the server 7, which manages the VoIP communication apparatus 4 or the IP telephone set 6. As shown in FIG. 4, on the other hand, the correspondence storage unit 403b is set and stored with corresponding relations between a telephone number (or selection information) 403b-1 and an IP address 403b-2 of both the VoIP communication apparatus 4 accommodating the voice terminal 5 having that telephone number and the IP telephone set 6. Here, the IP address 403b-2 can make a plurality of IP addresses correspond to one telephone number, as enumerated in a table 403b3, and so that the telephone number can be the key number of the PBX 53 in the connection mode of the LAN 24, as shown in FIG. 1.

In accordance with an instruction from the call control unit 401, a tone generation unit 402 generates various tone signals, and sends the generated tone signals to the voice terminal 5 through the voice terminal IF unit 404.

A terminal IF unit 407 is an interface which connects a maintenance terminal, and a setting unit 408 sets information in the CA storage unit 403a and the correspondence storage unit 403b in the storage unit 403. In accordance with the instruction from the maintenance terminal, the setting unit 408 sets and registers, in the CA storage unit 403a in the storage unit 403, the IP address of the server 7 which manages the VoIP communication apparatus 4 and the IP telephone set 6. Further, the setting unit 408 sets and registers, in the correspondence storage unit 403b, the corresponding relations between the telephone number 403b-1 and the IP address 403b-2 of the VoIP communication apparatus 4 accommodating the voice terminal 5 having that telephone number and the IP telephone set 6.

The call control unit 401 connects the call by performing the processing according to the flows shown in FIGS. 10 to 13 and FIG. 16, thereby to establish the voice communication path between the voice terminal 5 connected by the VoIP communication apparatus 4 of itself and the VoIP communication apparatus 4 or the IP telephone set 6 of the communication partner.

The IP telephone set 6 will be described in more detail.

Figure 5:
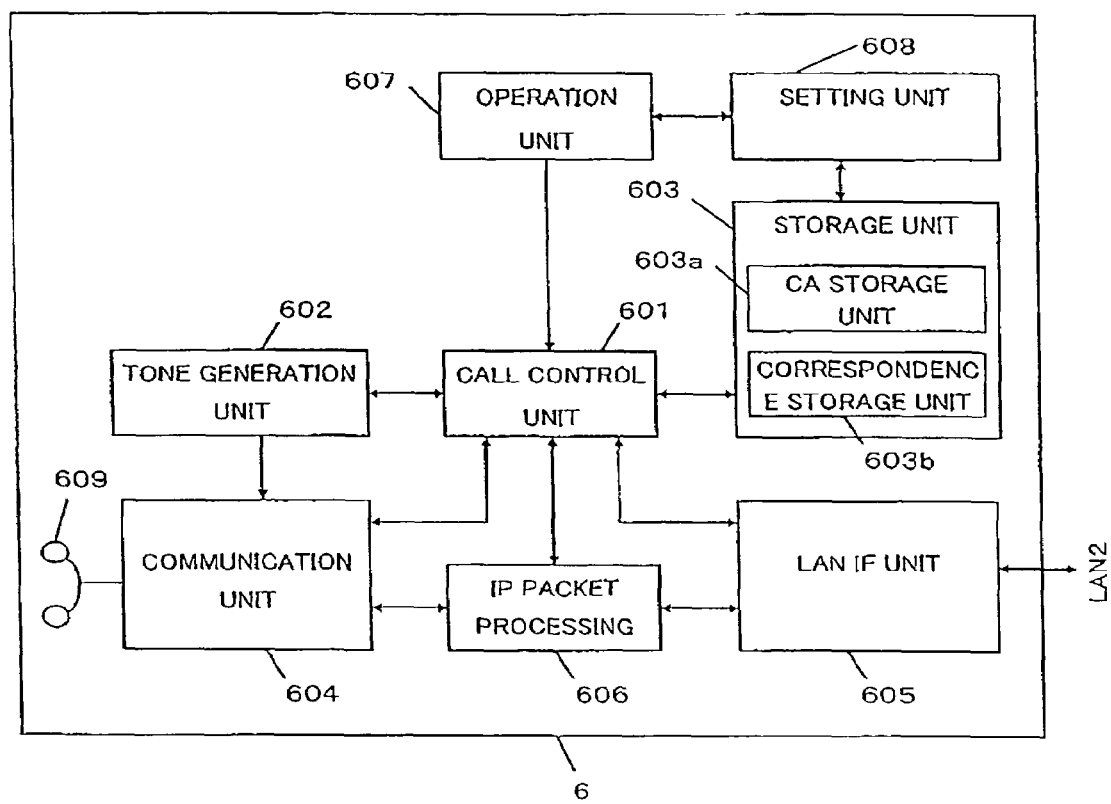
FIG. 5 is a schematic configuration diagram of an IP telephone set 61 or 62 shown in FIG. 1.

FIG. 5 is a schematic configuration diagram of the IP telephone set 6.

In FIG. 5, a communication unit 604 has a hook button to connect a hand set 609, and processes the voice signals/voice data, which are transmitted/received through the hand set 609. Thus, the communication unit 604 relays the voice data between the hand set 609 and an IP packet processing unit 606.

A LAN IF unit 605 is an interface which connects the LAN 2, and performs a processing according to the standards of interface specifications adopted by the LAN 2. Thus, the LAN IF unit 605 relays the IP packet between the LAN 2 and the IP packet processing unit 606.

In accordance with an instruction from a call control unit 601, the IP packet processing unit 606 converts the voice data which are set from the communication unit 604, and the communication connection message which is sent from the call control unit 601 to perform the voice communication, into the IP packet which has the IP address notified by the call control unit 601, and sends the IP packet to the LAN IF unit 605. Moreover, the IP packet processing unit 606 extracts data from the IP packet which is sent from the LAN IF unit 605 and addressed to its own IP telephone set 6, and sends the extracted data to the communication unit 604 or the call control unit 601 in accordance with the instruction from the call control unit. 601.

An operation unit 607 has a dial button, a function button and a letter indicator, and transmits the dial (or the telephone number) inputted by the operator, to the call control unit 601. In response to the dial, the call control unit 601 converts the communication connection message to perform the voice communication with the IP packet processing unit 606, into the IP packet, and sends the IP packet to the LAN IF unit 605.

Figure 6:
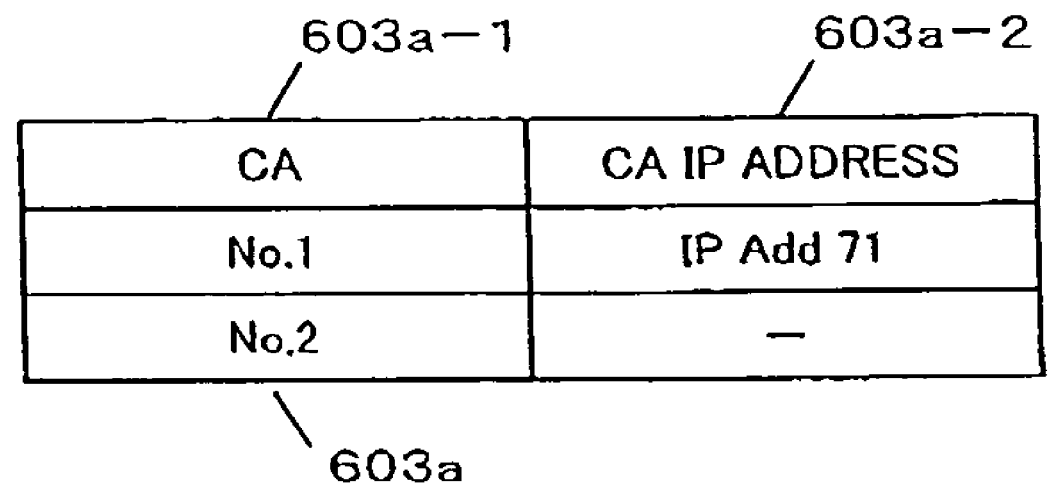

A storage unit 603 includes a CA storage unit 603a and a correspondence storage unit 603b. As shown in FIG. 6, the CA storage unit 603a is set and stored with an IP address 603a-2 corresponding to the server 7 which manages the VoIP communication apparatus 4 or the IP telephone set 6. As shown in FIG. 7, the correspondence storage unit 603b is set and stored with the corresponding relations between a telephone number (or selection information) 603b-1 and an IP address 603b-2 of both the VoIP communication apparatus 4 accommodating the voice terminal 5 having that telephone number and the IP telephone set 6.

In accordance with an instruction from the call control unit 601, a tone generation unit 602 generates various tone signals, and sends the generated tone signals to the hand set 609 through the communication unit 604.

The operation unit 607 has a function as input means which inputs maintenance setting information by the operation procedure of a predetermined dial button or function button. A setting unit 608 sets the information in the CA storage unit 603a and the correspondence storage unit 603b in the storage unit 603. In accordance with an instruction from the operation unit 607, the setting unit 608 sets and registers, in the CA storage unit 603a in the storage unit 603, the IP address of the server 7 which manages the VoIP communication apparatus 4 and the IP telephone set 6. Further, the setting unit 608 sets and registers the correspondence storage unit 603b with the corresponding relations between the telephone number 603b-1 and the IP address 603b-2 of the VoIP communication apparatus 4 accommodating the voice terminal 5 having that telephone number and the IP telephone set 6.

Figure 13:
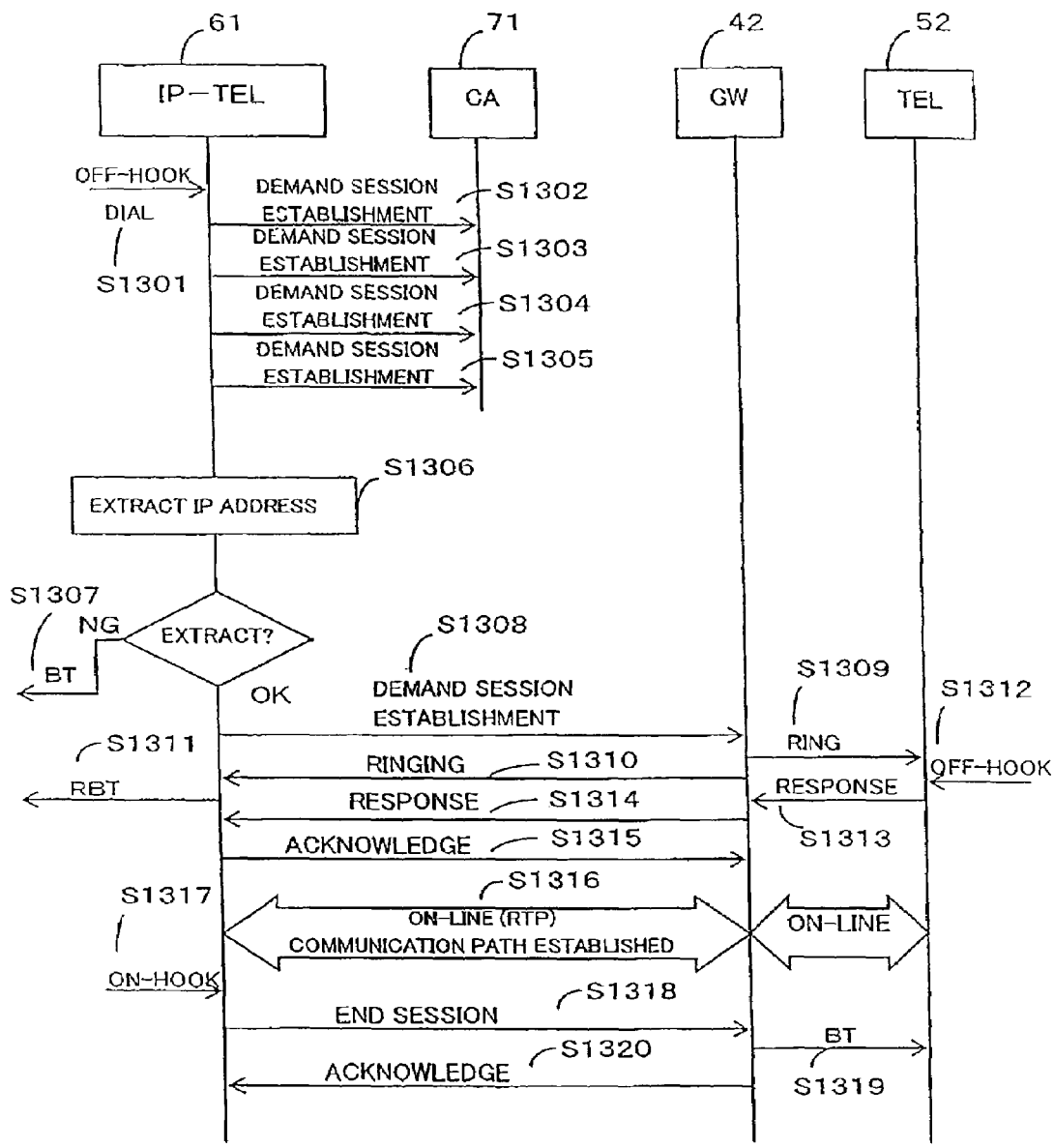
FIG. 13 is a sequence diagram for explaining the actions of the case, in which the server 71 does not respond to the call-initiate made from the IP telephone set 61 to the telephone set 52, as shown in FIG. 1.

The call control unit 601 performs a processing according to a flow shown in FIG. 13, to connect a call thereby to establish a voice communication path between the IP telephone set 6 of itself and the VoIP communication apparatus 4 of the communication partner or the IP telephone set 6.

The server 7 will be described in more detail.

Figure 8:
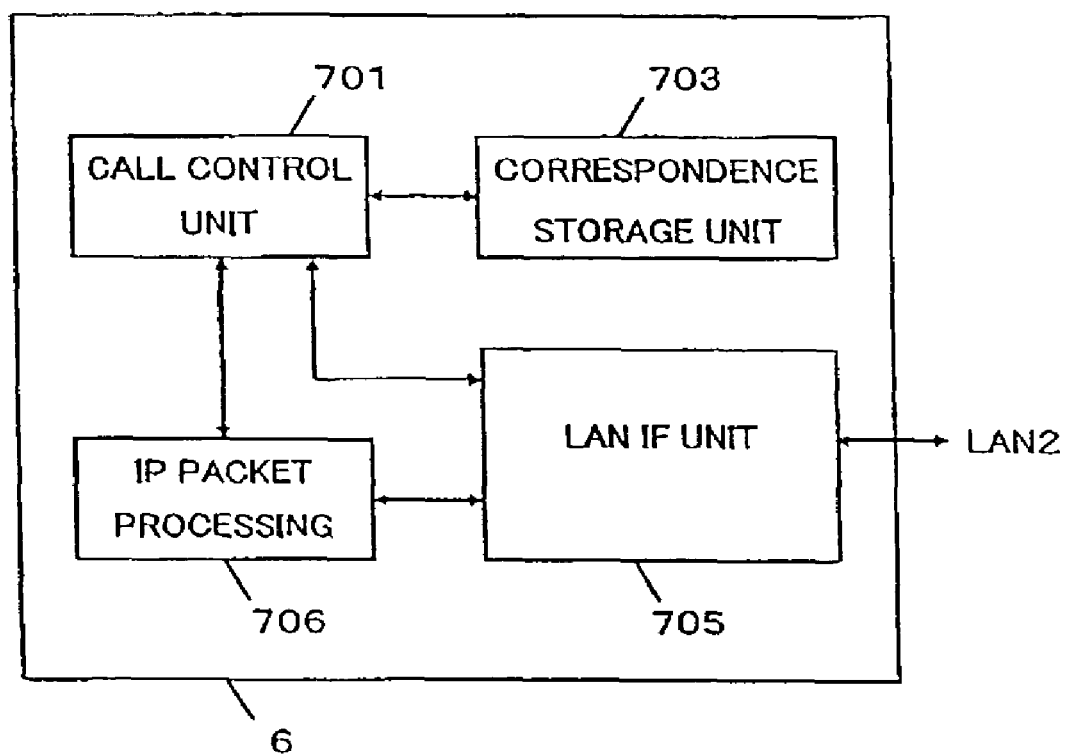
FIG. 8 is a schematic configuration diagram of a server 71 shown in FIG. 1.

FIG. 8 is a schematic configuration diagram of the server 7.

In FIG. 8, a LAN. IF unit 705 is an interface which connects the LAN 2, and performs a processing according to the standards of the interface specifications adopted by the LAN 2. As a result, the LAN IF unit 705 relays the IP packet between the LAN 2 and an IP packet processing unit 706.

The IP packet processing unit 706 stores the communication connection message which is received from a call control unit 701 thereby to perform the voice communication, in the IP packet, to which the IP address notified by the call control unit 701 is addressed, and sends that message to the LAN IF unit 705. Moreover, the IP packet processing unit 706 extracts the data from the IP packet which is sent from the LAN IF unit 705 and addressed to the server 7, and notifies the call control unit 701 of the extracted data.

A correspondence storage unit 703 is stored with corresponding relations between a telephone number (or selection information) 703-1 and an IP address 703-2 of the VoIP communication apparatus 4 accommodating the voice terminal 5 having that telephone number and the IP telephone set 6 as shown in FIG. 9. Here, the IP address 703-2 can make a plurality of IP addresses to one telephone number and can make such a setting that the telephone number is the key number of the PBX 53 in the connection mode of the LAN 24 shown in FIG. 1.

Moreover, that setting and registration in the correspondence storage unit 703 are performed not only by the method (i.e., the static setting method), in which the service man sets by operating the not-shown maintenance terminal, but also by the method (i.e., the dynamic setting method), in which the server 7 sets in response to a periodic demand for the registration as the positional information when the VoIP communication apparatus 4 and the IP telephone set 6 comes to on-line and when the VoIP communication apparatus 4 and the IP telephone set 6 are on-line. The dynamic setting method can be easily performed by using the register procedure regulated by the SIP of the RFC, for example, so that its detailed operating procedure is omitted.

The server 7 extracts data from the IP packet which is sent from the LAN IF unit 705 and addressed to the server 7, and notifies the call control unit 701 of the extracted data. If it is recognized by the call control unit 701 that the data contents notified are a demand for registration of the position information, the server 7 extracts the information on the correspondence between the transmitted IP address of the VoIP communication apparatus 4 or the IP telephone set 6 and the telephone number from the position information contents, and stores the correspondence storage unit 703 shown in FIG. 9 with that correspondence information thereby to update the set information of the correspondence storage unit 703.

Here is omitted the description of the remaining configuration elements of the VoIP communication system shown in FIG. 1 because they can be realized by the existing technique.

Here will be described the actions of the VoIP communication.

Figure 10:
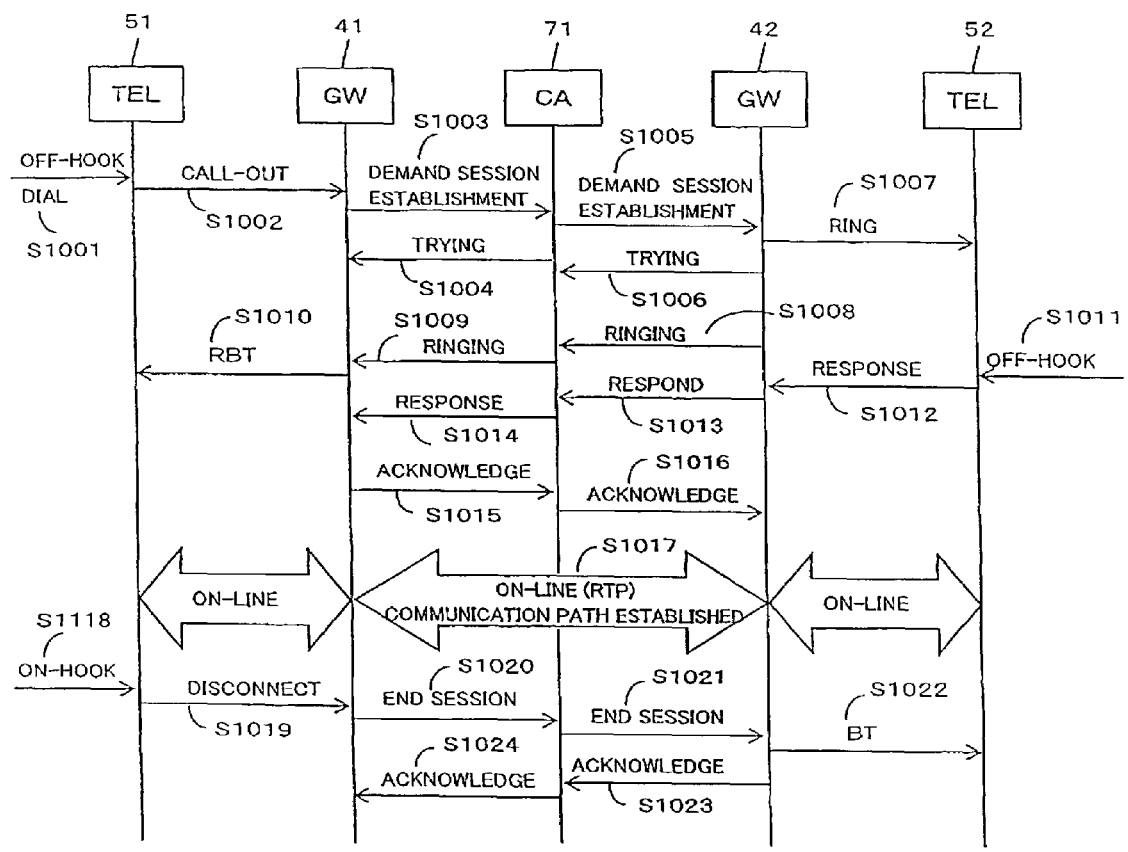
FIG. 10 is a sequence diagram for explaining the normal actions of the case, in which a call-initiate is made from a telephone set 51 to a telephone set 52 shown in FIG. 1.

At first, the normal actions of the case, in which the telephone set 51 connected with the VoIP communication apparatus 41 makes a transmission in FIG. 1 to the telephone set 52 connected with the VoIP communication apparatus 42, will be described with reference to FIG. 10.

The call control unit 401 of the VoIP communication apparatus 41 receives (S1001) the off-hook status signal of the telephone set 51 and the dial (i.e., the telephone number of the telephone set 52) through the voice terminal IF unit 404, and recognizes (S1002) the call demand. Then, the call control unit 401 transmits (S1003) the received telephone number information (Tel No 52) (i.e., the session establishment demand message (e.g., the "INVITE" message of the SIP) containing the selection information for specifying the communication partner), i.e., the message indicating the call connection demand to the server 71 through the IP packet processing unit 406 and the LAN IF unit 405. With reference to the CA storage unit 403a shown in FIG. 3, more specifically, the call control unit 401 extracts the IP address (IP Add 71) of the server 71, and demands the IP packet processing unit 406 to send the session establishment demand message (e.g., the "100 Trying" message of the SIP) containing the received telephone number information to the destination of that IP address.

The server 71 receives the session establish demand message at the IP packet processing unit 706 through the LAN IF unit 705, and transmits the notified information to the call control unit 701. When the call control unit 701 recognizes that the notified information received is the session establishment demand message, the call control unit 701 acknowledges the trying message, i.e., the session establishment demand message, and notifies the IP packet processing unit 706 of it so that the message indicating that the IP address of the VoIP communication apparatus 42 (or the telephone set 52) or the communication partner is being extracted may be returned, thereby to transmit (S1004) the trying message to the VoIP communication apparatus 41.

In order that the IP address corresponding to the telephone number, the information of which is contained in the notified information of the session establishment demand message, may be extracted from the information, the call control unit 701 of the server 71 accesses to the correspondence storage unit 703 thereby to search the IP address corresponding to that telephone number. When the IP address (IP Add 42) corresponding to the telephone number of the telephone set 52 is extracted, the IP packet processing unit 706 creates the IP packet, to which the IP address is given, and sends the IP packet through the LAN IF unit 705 thereby to send (S1005) the session establishment demand message to the VoIP communication apparatus 42.

The VoIP communication apparatus 42 having received that session establishment demand message extracts the notified information at the IP packet processing unit 406 through the LAN IF unit 405, and transmits the extracted information to the call control unit 401. The call control unit 401 recognizes from the notified information the session establishment demand message, namely, that the call connection demand has been made, and instructs the IP packet processing unit 406 to send out the trying message, i.e., the message to notify that the session establishment demand message has been acknowledged, and sends (S1006) the trying message to the server 71 through the LAN IF unit 405.

Along with this processing, the call control unit 401 instructs the voice terminal IF unit 404 to ring the telephone et 52, so that the voice terminal IF unit 404 sends (S1007) ringing signal to the telephone set 52. After this, the call control unit 401 instructs the IP packet processing unit 406 to send the ringing message indicating that the telephone set 52 is being rung, to the server 71, so that the IP packet processing unit 406 sends (S1008) the ringing message (e.g., the "180 Ringing" message of the SIP) to the server 71 through the LAN IF unit 405.

The server 71 receives the ringing message at the IP packet processing unit 706 through the LAN IF unit 706, and sends the notified information to the call control unit 701. When the call control unit 701 recognizes that the received information is the ringing message, the call control unit 701 relays and notifies the IP packet processing unit 706 that the ringing message is returned to the VoIP communication apparatus 41 (or the telephone set S1), so that the IP packet processing unit 706 transmits (S1009) the ringing message to the VoIP communication apparatus 41.

The VoIP communication apparatus 41 having received that ringing message extracts the notified information at the IP packet processing unit 406 through the LAN IF unit 405, and transmits the notified information to the call control unit 401. This call control unit 401 recognizes the ringing message from the notified information, and instructs the tone generation unit 402 to output a ring-back tone (RBT), so that the voice terminal IF unit 404 sends (S1010) the ring-back tone outputted by the tone generation unit 402, to the voice terminal 5 (or the telephone set 51).

Here, the ring-back tone sending method may be performed not only by the method, in which the ring-back tone is outputted by the tone generation unit 402 of the VoIP communication apparatus 4, but also by the method, in which the ring-back tone is outputted by the tone generation unit 402 on the side of the VoIP communication apparatus 42 and is transmitted to the VoIP communication apparatus 41 through the IP network 1.

In this state, when the operator operates the telephone set 52 in the off-hook status (S1011) the telephone set 52 to respond to the ring, a response signal is sent (S1012) from the telephone set 52 to the VoIP communication apparatus 42. This VoIP communication apparatus 42 transmits the response signal, when it receives from the voice terminal IF unit 404, to the call control unit 401. The call control unit 401 instructs, when it recognizes the response, the IP packet processing unit 406 to send the response message to the server 71, so that the IP packet processing unit 406 sends (S1013) the response message to the server 71 through the LAN IF unit 405.

The server 71 receives the response message at the IP packet processing unit 706 through the LAN IF unit 705, and transmits the notified information to the call control unit 701. When the call control unit 701 recognizes that the notified information received is the response message, the call control unit 701 notifies the IP packet processing unit 706 to return the response message in a relaying manner to the VoIP communication apparatus 41, so that the IP packet processing unit 706 transmits (S1014) the response message (e.g., the "200 OK" message of the SIP) to the VoIP communication apparatus 41 through the LAN IF unit 705.

The VoIP communication apparatus 41 having received that response message extracts the notified information at the IP packet processing unit 406 through the LAN IF unit 405, and transmits the extracted information to the call control unit 401. The call control unit 401 recognizes the response message with the notified information, and instructs the IP packet processing unit 406 to send the acknowledgment, i.e., the message notifying the acknowledgment of the response message, so that the IP packet processing unit 406 sends (S1015) the acknowledgment message (e.g., the "ACK" message of the SIP) to the server 71 through the LAN IF unit 405.

The server 71 receives the acknowledgment message at the IP packet processing unit 706 through the LAN IF unit 705, and transmits the notified information to the call control unit 701. When the call control unit 701 recognizes that the notified information received is the acknowledgment message, the call control unit 701 notifies the IP packet processing unit 706 to return the acknowledgment message in a relaying manner to the VoIP communication apparatus 42, so that the IP packet processing unit 706 transmits (S1016) the acknowledgment message to the VoIP communication apparatus 42 through the LAN IF unit 705.

The communication path is established by the actions thus far described, so that the communication or the voice communication (VoIP) by the IP packet is performed between the VoIP communication apparatus 41 and the VoIP communication apparatus 42 by the RTP (Real Time Protocol) Moreover, the VoIP communication apparatus 41 and the VoIP communication apparatus 42 connect the telephone set 51 and the telephone set 52, respectively, with the IP network 1 through the voice terminal IF unit 404, the IP packet processing unit 406 and the LAN IF unit 405 thereby to establish (S1017) the communication state between the telephone set 51 and the telephone set 52.

When the communication ends so that the operator operates the telephone set 51 in the on-hook status (S1018), a disconnection signal is sent (S1019) from the telephone set 51 to the VoIP communication apparatus 41. The VoIP communication apparatus 41 transmits the disconnection signal, when it receives at the voice terminal IF unit 404, to the call control unit 401. This call control unit 401 recognizes the disconnection and instructs the IP packet processing unit 406 to send the session ending message, i.e., the message indicating the communication disconnection demand to the server 71, so that the IP packet processing unit 406 sends (S1020) the session ending message (e.g., the "BYE" message of the SIP) to the server 71 through the LAN IF unit 405.

The server 71 receives the session ending message at the IP packet processing unit 706 through the LAN IF unit 705, and transmits the notified information to the call control unit 701. When the call control unit 701 recognizes that the notified information received is the session ending message, the call control unit 701 notifies the IP packet processing unit 706 to return the session ending message in a relaying manner to the VoIP communication apparatus 42, so that the IP packet processing unit 706 transmits (S1021) the session ending message (e.g., the "200 OK" message of the SIP) to the VoIP communication apparatus 42 through the LAN IF unit 705.

The VoIP communication apparatus 42 having received that session ending message extracts the notified information at the IP packet processing unit 406 through the LAN IF unit 405, and transmits the extracted information to the call control unit 401. The call control unit 401 recognizes the session ending message with the notified information, and instructs the tone generation unit 402 to send an ending sound (i.e., a busy tone: BT) to the telephone set 52, so that the tone generation unit 402 sends the ending tone to the telephone set 52 through the voice terminal IF unit 404 (S1022).

Along with this processing, the call control unit 401 instructs the IP packet processing unit 406 to send an acknowledgment message, i.e., a message notifying the acknowledgment of the session ending message to the server 71, so that the IP packet processing unit 406 sends (S1023) the acknowledgment message to the server 71 through the LAN IF unit 405.

The server 71 receives the acknowledgment message at the IP packet processing unit 706 through the LAN IF unit 705, and transmits the notified information to the call control unit 701. When the call control unit 701 recognizes that the notified information received is the acknowledgment message, the call control unit 701 releases the communication and notifies the IP packet processing unit 706 to return the acknowledgment message in a relaying manner to the VoIP communication apparatus 41, so that the IP packet processing unit 706 transmits (S1024) the acknowledgment message to the VoIP communication apparatus 41 through the LAN IF unit 705.

The VoIP communication apparatus 41 having received that acknowledgment message extracts the notified information at the IP packet processing unit 406 through the LAN IF unit 405, and transmits the extracted information to the call control unit 401. The call control unit 401 recognizes the acknowledgment message with the notified information, and releases the communication.

Thus, the telephone set 51 connected with the VoIP communication apparatus 41 is connected with the telephone set 52 connected with the VoIP communication apparatus 42, thereby to perform the voice communication (VoIP) with the IP packet.

As shown in FIG. 1, there is a case where the telephone set 51 connected with the VoIP communication apparatus 41 transmits to the telephone set 52 connected with the VoIP communication apparatus 42, when the server 71 is disabled to respond by the trouble of itself or the trouble of the lines. Here the actions of the above case will be described with reference to FIG. 11.

Figure 11:
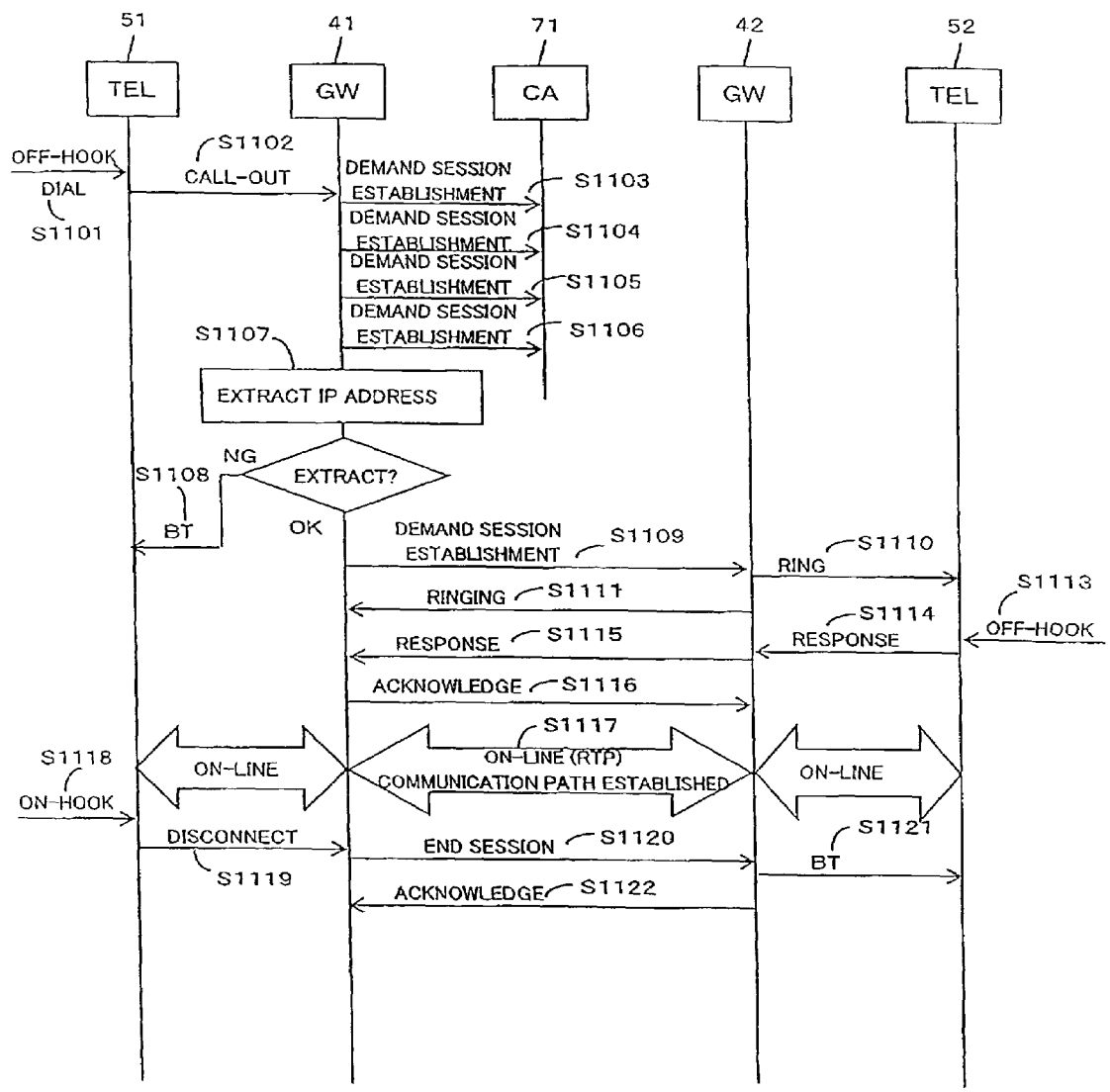
FIG. 11 is a sequence diagram for explaining the actions of the case, in which the server 71 does not respond to the call-initiate made from the telephone set 51 to the telephone set 52, as shown in FIG. 1.

With reference to FIG. 11, here will be described the actions of the case, in which the server 71 is disabled to respond by the trouble of itself or the trouble of the lines, as shown in FIG. 1, and in which the telephone set 51 connected with the VoIP communication apparatus 41 transmits to the telephone set 52 connected with the VoIP communication apparatus 42.

The call control unit 401 of the VoIP communication apparatus 41 receives (S1101) the off-hook status signal of the telephone set 51 and the dial (i.e., the telephone number of the telephone set 52) through the voice terminal IF unit 404, and recognizes (S1102) the call demand. Then, the call control unit 401 transmits (S1103) the received telephone number information (Tel No 52) (i.e., the session establishment demand message containing the selection information for specifying the communication partner), i.e., the message indicating the call connection demand to the server 71 through the IP packet processing unit 406 and the LAN IF unit 405. With reference to the CA storage unit 403a shown in FIG. 3, more specifically, the call control unit 401 extracts the IP address (IP Add 71) of the server 71, and demands the XP packet processing unit 406 to send the session establishment demand message containing the received telephone number information to the destination of that IP address.

In case the call control unit 401 does not receive any response message such as the trying message from the server 71 for predetermined time period such as 0.5 seconds, the call control unit 401 sends. (S1104) again a session establishment demanding message containing the telephone number information (Tel No 52) received, to the server 71. In case the call control unit 401 does not receive the trying message from the server 71 for predetermined time period such as 1.0 second, the call control unit 401 sends (S1105) the session establishment demanding message containing the telephone number information (Tel No 52) received, to the server 71. In case the call control unit 401 does not receive the trying message from the server 71 for predetermined time period such as 2.0 seconds, the call control unit 401 sends (S1106) again the session establishment demanding message containing the telephone number information (Tel No 52) received, to the server 71.

In case no response from the server 71 is obtained even if the sending of the session establishment demanding message is tried several times (i.e., three times in the embodiment), the call control unit 401 accesses to the correspondence storage unit 403b in the storage unit 403 to search whether or not the telephone number identical to the dial (i.e., the telephone number of the telephone set 52) obtained from the telephone set 51 is registered, and tries (S1107) the extraction of the corresponding IP address.

As a result, in case the call control unit 401 has failed to find the telephone number identical to the dial (i.e., the telephone number of the telephone set 52) obtained from the telephone set 51, the call control unit 401 decides that the connection is impossible, and instructs the tone generation unit 402 to send the disconnect ability sound (i.e. the busy tone: BT) to the telephone set 51, so that the tone generation unit 402 sends (S1108) the disconnectability sound to the telephone set 51 through the voice terminal IF unit 404.

In case the call control unit 401 finds, as a result of the search, the telephone number identical to the dial (i.e., the telephone number of the telephone set 52) obtained from the telephone set 51, on the contrary, the call control unit 401 extracts the IP address (i.e., IP Add 42) corresponding to that telephone number, and the IP packet processing unit 406 creates the IP packet having the IP address added thereto, and sends the created IP packet through the LAN IF unit 405 thereby to send (S109) the session establishment demanding message directly to the VoIP communication apparatus 42. Here, the timing to send the session establishment demanding message is performed, when 4.0 seconds, for example, elapses after the session establishment demanding message was sent at first, i.e., at the instant when it is warranted that the response from the server 71 is not continued.

The VoIP communication apparatus 42 having received the session establishment demanding message extracts the notified information at the IP packet processing unit 406 through the LAN IF unit 405, and transmits the information to the call control unit 401. This call control unit 401 recognizes it from the notified information the message is the session establishment demanding message, i.e., that the call connection demand has been made, and instructs the voice terminal IF unit 404 to ring the telephone set 52 so that the voice terminal IF unit 404 sends (S1110) the ringing signal to the telephone set 52.

Along with this processing, the call control unit 401 instructs the IP packet processing unit 406 to acknowledge the ringing message, i.e., the session establishment demanding message and to send a message notifying that the telephone set 52 is being rung, so that the IP packet processing unit 406 sends (S1111) the ringing message to the VoIP communication apparatus 41 through the LAN IF unit 405.

The VoIP communication apparatus 41 having received that ringing message extracts the notified information at the IP packet processing unit 406 through the LAN IF unit 405, and transmits the extracted information to the call control unit 401. The call control unit 401 recognizes the ringing message with the notified information, and instructs the tone generation unit 402 to output the ringing sound (i.e., the ring back tone: RBT), so that the voice terminal IF unit 404 sends (S1112) the ringing sound outputted by the tone generation unit 402, to the voice terminal 5 (or the telephone set 51).

In this state, when the operator operates the telephone set 52 in the off-status (S1113) to respond to the ring, a response signal is sent (S1114) from the telephone set 52 to the VoIP communication apparatus 42. This VoIP communication apparatus 42 transmits the response signal, when it receives from the voice terminal IF unit 404, to the call control unit 401. The call control unit 401 instructs, when it recognizes the response, the IP packet processing unit 406 to send the response message to the VoIP communication apparatus 41, so that the IP packet processing unit 406 sends (S1115) the response message to the VoIP communication apparatus 41 through the LAN IF unit 405.

The VoIP communication apparatus 41 having received that response message extracts the notified information at the IP packet processing unit 406 through the LAN IF unit 405, and transmits the extracted information to the call control unit 401. The call control unit 401 recognizes the response message with the notified information, and instructs the IP packet processing unit 406 to send the acknowledgment message, i.e., a message notifying that the response message has been acknowledged, to the VoIP communication apparatus 42, so that the IP packet processing unit 406 sends (S1116) the acknowledgment message to the VoIP communication apparatus 42 through the LAN IF unit 405.

The communication path is established by the actions thus far described, so that the communication or the voice communication (VoIP) by the IP packet is performed between the VoIP communication apparatus 41 and the VoIP communication apparatus 42 by the RTP (Real Time Protocol) Moreover, the VoIP communication apparatus 41 and the VoIP communication apparatus 42 connect the telephone set 51 and the telephone set 52, respectively, with the IP network 1 through the voice terminal IF unit 404, the IP packet processing unit 406 and the LAN IF unit 405 thereby to establish (S1117) the communication state between the telephone set 51 and the telephone set 52.

When the communication ends so that the operator operates the telephone set 51 in the on-hook status (S1118), a disconnection signal is sent (S1119) from the telephone set 51 to the VoIP communication apparatus 41. The VoIP communication apparatus 41 transmits the disconnection signal, when it receives at the voice terminal IF unit 404, to the call control unit 401. This call control unit 401 recognizes the disconnection and instructs the IP packet processing unit 406 to send the session ending message, i.e., the message indicating the communication disconnection demand to the VoIP communication apparatus 42, so that the IP packet processing unit 406 sends (S1120) the session ending message to the VoIP communication apparatus 42 through the LAN IF unit 405.

The VoIP communication apparatus 42 having received that session ending message extracts the notified information at the IP packet processing unit 406 through the LAN IF unit 405, and transmits the extracted information to the call control unit 401. The call control unit 401 recognizes the session ending message with the notified information, and instructs the tone generation unit 402 to send the ending sound (i.e., the busy tone: BT) to the telephone set 52, so that the tone generation unit 402 sends (S1121) the ending sound to the telephone set 52 through the voice terminal IF unit 404.

Along with this processing, the call control unit 401 instructs the IP packet processing unit 406 to send the acknowledgment message, i.e., the message notifying the acknowledgment of the session ending message, to the VoIP communication apparatus 41, so that the IP packet processing unit 406 sends (S1122) the acknowledgment message to the VoIP communication apparatus 41 through the LAN IF unit 405.

The VoIP communication apparatus 41 having received that acknowledgment message extracts the notified information at the IP packet processing unit 406 through the LAN IF unit 405, and transmits the extracted information to the call control unit 401. The call control unit 401 recognizes the acknowledgment message with the notified information, and performs the releasing processing of the communication.

As has been described hereinbefore, in case the server 71 is disabled to respond by the trouble of itself or the trouble of the lines, the VoIP communication apparatus 41 performs the communication connecting procedure directly with the VoIP communication apparatus 42, if the VoIP communication apparatus 41 is the partner for which it registers the IP address by itself. Then, the telephone set 51 connected with the VoIP communication apparatus 41 is connected with the telephone set 52 which is connected with the VoIP communication apparatus 42, so that it performs the voice communication (VoIP) with the IP packet.

Figure 12:
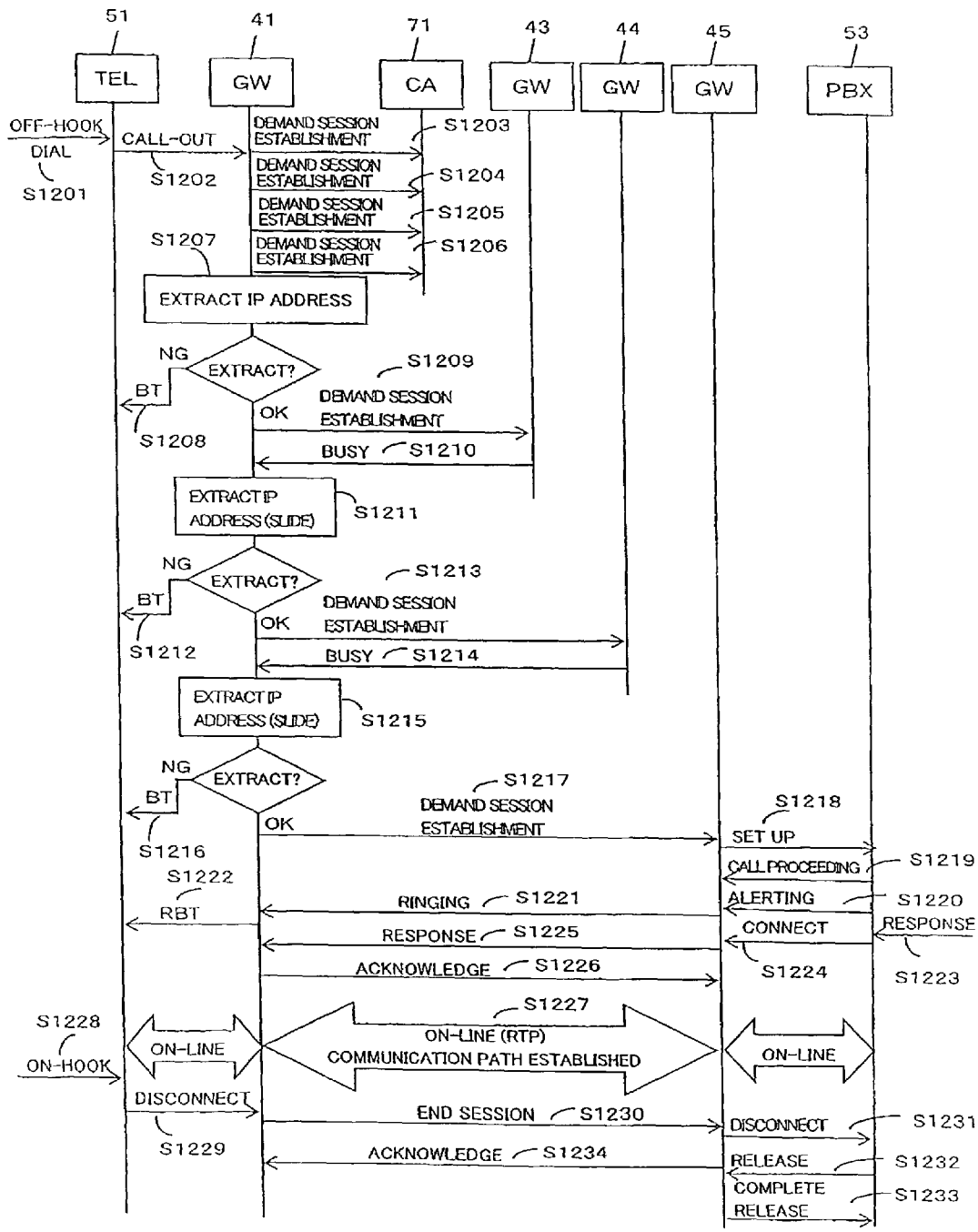
FIG. 12 is a sequence diagram for explaining the actions of the case, in which the server 71 does not respond to the call-initiate made from the telephone set 51 to a PBX 53, as shown in FIG. 1.

There is a case where the telephone set 51 connected with the VoIP communication apparatus 41 transmits to the PBX 53 connected with the VoIP communication apparatuses 43 to 46 when the server 71 of FIG. 1 is disabled to respond by the trouble of itself or the trouble of the lines The actions of the above case will be described with reference to FIG. 12. With reference to FIG. 12, here will be described the actions of the case, in which the telephone set 51 connected with the VoIP communication apparatus 41 transmits to the PBX 53 connected with the VoIP communication apparatuses 43 to 46 incase the server 71 of FIG. 1 is disabled to respond by the trouble of itself or the trouble of the lines.

The call control unit 401 of the VoIP communication apparatus 41 receives (S1201) the off-hook status signal of the telephone set 51 and the dial (i.e., the telephone number of the PBX 53) through the voice terminal IF unit 404, and recognizes (S1202) the call demand for the PBX 53. Then, the call control unit 401 transmits (S1203) the received telephone number information (Tel No 53) (i.e., the session establishment demand message containing the selection information for specifying the communication partner), i.e., the message indicating the call connection demand to the server 71 through the IP packet processing unit 406 and the LAN IF unit 405. With reference to the CA storage unit 403a shown in FIG. 3, more specifically, the call control unit 401 extracts the IP address (IP Add 71) of the server 71, and demands the IP packet processing unit 406 to send the session establishment demand message containing the received telephone number information to the destination of that IP address.

In case the call control unit 401 does not receive any response message such as the trying message from the server 71 for predetermined time period such as 0.5 seconds, the call control unit 401 sends (S1204) again a session establishment demanding message containing the telephone number information (Tel No 53) received, to the server 71. In case the call control unit 401 does not receive the trying message from the server 71 for predetermined time period such as 1.0 second, the call control unit 401 sends (S1205) the session establishment demanding message containing the telephone number information (Tel No 53) received, to the server71. In case the call control unit 401 does not receive the trying message from the server 71 for predetermined time period such as 2.0 seconds, the call control unit 401 sends (S1206) again the session establishment demanding message containing the telephone number information (Tel No 53) received, to the server 71.

In case no response from the server 71 is obtained even if the sending of the session establishment demanding message is tried several times, the call control unit 401 accesses to the correspondence storage unit 403b in the storage unit 403 to search whether or not the telephone number identical to the dial (i.e., the telephone number of the PBX 53) obtained from the telephone set 51 is registered, and tries (S1207) the extraction of the corresponding IP address.

As a result, in case the call control unit 401 has failed to find the telephone number identical to the dial (i.e., the telephone number of the PBX 53) obtained from the telephone set 51, the call control unit 401 decides that the connection is impossible, and instructs the tone generation unit 402 to send the disconnectability sound (i.e., the busy tone: BT) to the telephone set 51, so that the tone generation unit 402 sends (S1208) the disconnectability sound to the telephone set 51 through the voice terminal IF unit 404.

In case the call control unit 401 finds, as a result of the search, the telephone number identical to the dial (i.e., the telephone number of the PBX 53) obtained from the telephone set 51, on the contrary, the call control unit 401 extracts the IP address (i.e., IP Add 43) corresponding to that telephone number, and IP packet processing unit 406 creates the IP packet having the IP address added thereto, and sends the created IP packet through the LAN IF unit 405 thereby to send (S1209) the session establishment demanding message to the VoIP communication apparatus 43. In case it is recognized at S1207 that pluralities of IP addresses are registered for the telephone number, one arbitrary IP address (IP Add 43 in this case) is extracted.

The VoIP communication apparatus 43 having received the session establishment demanding message extracts the notified information at the IP packet processing unit 406 through the LAN IF unit 405, and transmits the information to the call control unit 401. This call control unit 401 recognizes it from the notified information the message is the session establishment demanding message, i.e., that the call connection demand has been made. In case the VoIP communication apparatus 43 is being connected with another telephone set so that it is in the busy state, the VoIP communication apparatus 43 instructs the IP packet processing unit 406 to send the busy message, i.e., the message notifying that it acknowledges the session establishment demanding message but is communicating with another telephone set, to the VoIP communication apparatus 41, so that the IP packet processing unit 406 sends (S1210) the busy message to the VoIP communication apparatus 41 through the LAN IF unit 405.

The VoIP communication apparatus 41 having received that busy message extracts the notified information at the IP packet processing unit 406 through the LAN IF unit 405, and transmits the extracted information to the call control unit 401. The call control unit 401 recognizes the busy message with the notified information. Then, the call control unit 401 accesses again to the correspondence storage unit 403*b* in the storage unit 403, and tries (S1211) to extract (or slide) another IP address corresponding to the telephone umber identical to the dial (i.e., the telephone number of the PBX 53) obtained from the telephone set 51.

As a result, in case the call control unit 401 has failed to find another IP address corresponding to the telephone number identical to the dial (i.e., the telephone number of the PBX 53) obtained from the telephone set 51, the call control unit 401 decides that the connection is impossible, and instructs the tone generation unit 402 to send the disconnectability sound (i.e., the busy tone: BT) to the telephone set 51, so that the tone generation unit 402 sends (S1212) the disconnectability sound to the telephone set 51 through the voice terminal IF unit 404.

In case the call control unit 401 finds, as a result of the search, another IP address corresponding to the telephone number identical to the dial (i.e., the telephone number of the PBX 53) obtained from the telephone set 51, on the contrary, the call control unit 401 extracts the IP address (i.e., IP Add 44) corresponding to that telephone number, and the IP packet processing unit 406 creates the IP packet having the IP address added thereto, and sends the created IP packet through the LAN IF unit 405 thereby to send (S1213) the session establishment demanding message to the VoIP communication apparatus 44. In case it is recognized at Step S1212 that pluralities of other IP addresses are registered for the telephone number, one arbitrary IP address (IP Add 44 in this case) is extracted.

The VoIP communication apparatus 44 having received the session establishment demanding message extracts the notified information at the IP packet processing unit 406 through the LAN IF unit 405, and transmits the information to the call control unit 401. This call control unit 401 recognizes it from the notified information the message is the session establishment demanding message, i.e., that the call connection demand has been made. In case the VoIP communication apparatus 44 is being connected with another telephone set 5 so that it is in the busy state, the VoIP communication apparatus 44 instructs the IF packet processing unit 406 to send the busy message to the VoIP communication apparatus 41, so that the IP packet processing unit 406 sends (S1214) the busy message to the VoIP communication apparatus 41 through the LAN IF unit 405.

Likewise, the VoIP communication apparatus 41 having received that busy message extracts the notified information at the IP packet processing unit 406 through the LAN IF unit 405, and transmits the extracted information to the call control unit 401. The call control unit 401 recognizes the busy message with the notified information. Then, the call control unit 401 accesses again to the correspondence storage unit 403*b* in the storage unit 403, and tries (S1215) to extract (or slide) another IP address corresponding to the telephone number identical to the dial (i.e., the telephone number of the PBX 53) obtained from the telephone set 51.

As a result, in case the call control unit 401 has failed to find another IP address corresponding to the telephone number identical to the dial (i.e., the telephone number of the PBX 53) obtained from the telephone set 51, the call control unit 401 decides that the connection is impossible, and instructs the tone generation unit 402 to send the disconnectability sound (i.e., the busy tone: BT) to the telephone set 51, so that the tone generation unit 402 sends (S1216) the disconnectability sound to the telephone set 51 through the voice terminal IF unit 404.

In case the call control unit 401 finds, as a result of the search, another IP address corresponding to the telephone number identical to the dial (i.e., the telephone number of the PBX 53) obtained from the telephone set 51, on the contrary, the call control unit 401 extracts the IP address (i.e., IP Add 45) corresponding to that telephone number, and the IP packet processing unit 406 creates the IP packet having the IP address added thereto, and sends the created IP packet through the LAN IF unit 405 thereby to send (S1217) the session establishment demanding message to the VoIP communication apparatus 45. In case it is recognized at Step S1215 that pluralities of other IP addresses are registered for the telephone number, one arbitrary IP address (IP Add 45 in this case) is extracted.

The VoIP communication apparatus 45 having received the session establishment demanding message extracts the notified information at the IP packet processing unit 406 through the LAN IF unit 405, and transmits the information to the call control unit 401. This call control unit 401 recognizes it from the notified information the message is the session establishment demanding message. In case a communicative connection is possible, the call control unit 401 instructs the voice terminal IF unit 404 the connection with the PBX 53 so that the voice terminal IF unit 404 sends (S1218) the call setting message to the PBX 53.

Here, it is assumed that the VoIP communication apparatuses 43 to 46 and the PBX 53 are connected through an I-interface specified in Q.931 of the ITU-T. Therefore, the PBX 53 acknowledges the call setting message (i.e., the "SET UP" message), and returns (Sl219) the call setting acceptance message (i.e., "CALL PROCEEDING" message) to the VoIP communication apparatus 45. The PBX 53 sets the internal terminal into the ringing state, and then sends (S1220) the ringing message (i.e., the "ALTERING" message) to the VoIP communication apparatus 45.

When the voice terminal IF unit 404 of the VoIP communication apparatus 45 receives the call setting acceptance message and the ringing message, the voice terminal IF unit 404 transmits those messages to the call control unit 401. Then, the call control unit 401 instructs the IP packet processing unit 406 to send the ringing message to the VoIP communication apparatus 41, so that the IP packet processing unit 406 sends (S1221) the ringing message to the VoIP communication apparatus 41 through the LAN IF unit 405.

The VoIP communication apparatus 41 having received that ringing message extracts the notified information at the IP packet processing unit 406 through the LAN IF unit 405, and transmits the extracted information to the call control unit 401. The call control unit 401 recognizes the ringing message with the notified information, and instructs the tone generation unit 402 to output the ringing sound (i.e., the ring back tone: RBT) to the tone generation unit 402, so that the voice terminal IF unit 404 sends (S1222) the ringing sound outputted by the tone generation unit 402, to the voice terminal 5 (or the telephone set 51).

Here, the ring-back tone sending method may be performed not only by the method, in which the ring-back tone is outputted by the tone generation unit 402 of the VoIP communication apparatus 41, but also by the method, in which the ring-back tone is outputted by the PBX 53 and is transmitted to the VoIP communication apparatus 41 through the IF network 1.

In this state, when the operator of the PBX 53 responds (S1223) through an extension telephone set, a connection message (i.e., the "CONNECT" message) is sent (S1224) from the PBX 53 to the VoIP communication apparatus 45. This VoIP communication apparatus 45 transmits the connection message, when it receives from the voice terminal IF unit 404, to the call control unit 401. The call control unit 401 recognizes the response with that connection message, and instructs the IP packet processing unit 406 to send the response message to the VoIP communication apparatus 41, so that the IP packet processing unit 406 sends (S1225) the response message to the VoIP communication apparatus 41 through the LAN IF unit 405.

The VoIP communication apparatus 41 having received that response message extracts the notified information at the IP packet processing unit 406 through the LAN IF unit 405, and transmits the extracted information to the call control unit 401. The call control unit 401 recognizes the response message with the notified information, and instructs the IP packet processing unit 406 to send the acknowledgment message to the VoIP communication apparatus 45, so that the IP packet processing unit 406 sends (S1226) the acknowledgment message to the VoIP communication apparatus 45 through the LAN IF unit 405.

The communication path is established by the actions thus far described, so that the communication or the voice communication (VoIP) by the IP packet is performed between the VoIP communication apparatus 41 and the VoIP communication apparatus 45 by the RTP (Real Time Protocol). Moreover, the VoIP communication apparatus 41 and the VoIP communication apparatus 45 connect the telephone set 51 and the PBX 53, respectively, with the IP network 1 through the voice terminal IF unit 404, the IP packet processing unit 406 and the LAN IF unit 405 thereby to establish (S1227) the communication state between the telephone set 51 and the PBX 53 (i.e., the extension telephone set of the PBX 53).

When the communication ends so that the operator operates the telephone set 51 in the on-hook status (S1228), a disconnection signal is sent (S1229) from the telephone set 51 to the VoIP communication apparatus 41. The VoIP communication apparatus 41 transmits the disconnection signal, when it receives at the voice terminal IF unit 404, to the call control unit 401. This call control unit 401 recognizes the disconnection and instructs the IP packet processing unit 406 to send the session ending message to the VoIP communication apparatus 45, so that the IP packet processing unit 406 sends (S1230) the session ending message to the VoIP communication apparatus 45 through the LAN IF unit 405.

The VoIP communication apparatus 45 having received that session ending message extracts the notified information at the IP packet processing unit 406 through the LAN IF unit 405, and transmits the extracted information to the call control unit 401. The call control unit 401 recognizes the session ending message with the notified information, and instructs the voice terminal IF unit 404 to send (S1231) the disconnection message (i.e., the "DISCONNECTED" message) to the PBX 53. The voice terminal IF unit 404 of the VoIP communication apparatus 45 receives (S1232) the release message (i.e., the "RELEASE" message) from the PBX 53 in accordance with the instruction from the VoIP communication (i.e., "RELEASE COMPLETE" message to the PBX 53.

Along with this processing, the call control unit 401 instructs the IP packet processing unit 406 to send the acknowledgment message to the VoIP communication apparatus 41, so that the IP packet processing unit 406 sends (S1234) the acknowledgment message to the VoIP communication apparatus 41 through the LAN IF unit 405.

The VoIP communication apparatus 41 having received that acknowledgment message extracts the notified information at the IP packet processing unit 406 through the LAN IF unit 405, and transmits the extracted information to the call control unit 401. The call control unit 401 recognizes the acknowledgment message with the notified information, and performs the releasing processing of the communication.

As has been described hereinbefore, in case the server 71 is disabled to respond by the trouble of itself or the trouble of the lines, the VoIP communication apparatus 41 performs the communication connecting procedure directly with the VoIP communication apparatuses 43 to 46, if the VoIP communication apparatus 41 is the partner for which it registers the IP address by itself Then, the telephone set 51 connected with the VoIP communication apparatus 41 is connected with the PBX 53 which is connected with the VoIP communication apparatuses 43 to 46, so that it performs the voice communication (VoIP) with the IP packet. In case the plural VoIP communication apparatuses 43 to 46 are connected with the PBX 53, the VoIP communication apparatus 41 itself slides to search the connection destination in accordance with the used states of the VoIP communication apparatuses 43 to 46, so that it is connected for the communications with the VoIP communication apparatuses 43 to 46 in free states.

There is a case where the IP telephone set 61 transmits to the telephone set S2 connected with the VoIP communication apparatus 42 when the server 71 of FIG. 1 is disabled to respond by the trouble of itself or the trouble of the lines. The actions of the above case will be described with reference to FIG. 13. With reference to FIG. 13, here will be described the actions of the case, in which the IP telephone set 61 transmits to the telephone set 52 connected with the VoIP communication apparatus 42 in case the server 71 of FIG. 1 is disabled to respond by the trouble of itself or the trouble of the lines.

The call control unit 601 of the IP telephone set 61 receives the off-hook status signal of the hand set 609 and the dial (i.e., the telephone number of the telephone set 52) through the communication unit 604 and the operation unit 607, and recognizes (S1301) the call demand. Then, the call control unit 601 transmits (S1302) the received telephone number information (Tel No 52) (i.e., the session establishment demand message containing the selection information for specifying the communication partner) to the server 71 through the IP packet processing unit 606 and the LAN IF unit 605. With reference to the CA storage unit 603a shown in FIG. 3, more specifically, the call control unit 601 extracts the IP address (IP Add 71) of the server 71, and demands the IP packet processing unit 606 to send the session establishment demand message containing the received telephone number information to the destination of that IP address.

In case the call control unit 601 does not receive a response message such as the trying message from the server 71 for predetermined time period such as 0.5 seconds, the call control unit 601 sends (S1303) again a session establishment demanding message containing the telephone number information (Tel No 52) received, to the server 71. In case the call control unit 601 does not receive the trying message from the server 71 for predetermined time period such as 1.0 second, the call control unit 601 sends (S1304) the session establishment demanding message containing the telephone number information (Tel No 52) received, to the server 71. In case the call control unit 601 does not receive the trying message from the server 71 for predetermined time period such as 2.0 seconds, the call control unit 601 sends (S1305) again the session establishment demanding message containing the telephone number information (Tel No 52) received, to the server 71.

In case no response from the server 71 is obtained even if the sending of the session establishment demanding message is tried several times (i.e., three times in the embodiment), the call control unit 601 accesses to the correspondence storage unit 603b in the storage unit 603 to search whether or not the telephone number identical to the dial (i.e., the telephone number of the telephone set 52) obtained from the operation unit 607 is registered, and tries (S1306) the extraction of the corresponding IP address.

As a result, in case the call control unit 601 has failed to find the telephone number identical to the dial (i.e., the telephone number of the telephone set 52) obtained from the operation unit 607, the call control unit 601 decides that the connection is impossible, and instructs the tone generation unit 602 to send the disconnectability sound (i.e. the busy tone: BT) to the hand set 609, so that the tone generation unit 602 sends (S1307) the disconnectability sound to the hand set 609 through the communication unit 604.

In case the call control unit 601 finds, as a result of the search, the telephone number identical to the dial (i.e., the telephone number of the telephone set 52) obtained from the operation unit 607, on the contrary, the call control unit 601 extracts the IP address (i.e., IP Add 42) corresponding to that telephone number, and the IP packet processing unit 606 creates the IP packet having the IP address added thereto, and sends the created IP packet through the LAN IF unit 605 thereby to send (S1308) the session establishment demanding message to the VoIP communication apparatus 42. Here, the timing to send the session establishment demanding message is performed, when 4.0 seconds, for example, elapses after the session establishment demanding message was sent at first, i.e., at the instant when it is warranted that the response from the server 71 is not continued.

The VoIP communication apparatus 42 having received the session establishment demanding message extracts the notified information at the IP packet processing unit 406 through the LAN IF unit 405, and transmits the information to the call control unit 401. This call control unit 401 recognizes it from the notified information the message is the session establishment demanding message, i.e., that the call connection demand has been made, and instructs the voice terminal IF unit 404 to ring the telephone set 52 so that the voice terminal IF unit 404 sends (S1309) the ringing signal to the telephone set 52.

Along with this processing, the call control unit 401 instructs the IP packet processing unit 406 to send the ringing message to the IP telephone set 61, so that the IP packet processing unit 406 sends (S1310) the ringing message to the IP telephone set 61 through the LAN IF unit 405.

The IP telephone set 61 having received that ringing message extracts the notified information at the IP packet processing unit 606 through the LAN IF unit 605, and transmits the extracted information to the call control unit 601. The call control unit 601 recognizes the ringing message with the notified information, and instructs the tone generation unit 602 to output the ringing sound (i.e., the ring back tone: RBT), so that the communication unit 604 sends (Sl311) the ringing sound outputted by the tone generation unit 602, to the hand set 609.

In this state, when the operator operates the telephone set 52 in the off-hook status (S1312) to respond to the ring, a response signal is sent (S1313) from the telephone set 52 to the VoIP communication apparatus 42. This VoIP communication apparatus 42 transmits the response signal, when it receives from the voice terminal IF unit 404, to the call control unit 401. The call control unit 401 instructs, when it recognizes the response, the IP packet processing unit 406 to send the response message to the IP telephone set 61, so that the IP packet processing unit 406 sends (S1314) the response message to the IP telephone set 61 through the LAN IF unit 405.

The IP telephone set 61 having received that response message extracts the notified information at the IP packet processing unit 606 through the LAN IF unit 605, and transmits the extracted information to the call control unit 601. The call control unit 601 recognizes the response message with the notified information, and instructs the IP packet processing unit 606 to send the acknowledgment message to the VoIP communication apparatus 42, so that the IP packet processing unit 606 sends (S1315) the acknowledgment message to the VoIP communication apparatus 42 through the LAN IF unit 605.

The communication path is established by the actions thus far described, so that the communication or the voice communication (VoIP) by the IP packet is performed between the VoIP communication apparatus 42 and IP telephone set 61 by the RTP (Real Time Protocol). Moreover, the VoIP communication apparatus 42 connects the telephone set 52, respectively, with the IP network 1 through the voice terminal IF unit 404, the IP packet processing unit 406 and the LAN IF unit 405 thereby to establish (Sl316) the communication state between the IP telephone set 61 and the telephone set 52.

When the communication ends so that the operator operates the IP telephone set 61 in the on-hook status (S1317), the IP telephone set 61 recognizes at the communication unit 604 and transmits the disconnection to the call control unit 601. This call control unit 601 recognizes the on-hook status and instructs the IP packet processing unit 606 to send the session ending message to the VoIP communication apparatus 42, so that the IP packet processing unit 606 sends (S1318) the session ending message to the VoIP communication apparatus 42 through the LAN IF unit 605.

The VoIP communication apparatus 42 having received that session ending message extracts the notified information at the IP packet processing unit 406 through the LAN XF unit 405, and transmits the extracted information to the call control unit 401. The call control unit 401 recognizes the session ending message with the notified information, and instructs the tone generation unit 402 to send the ending sound (i.e., the busy tone: BT) to the telephone set 52, so that the tone generation unit 402 sends (S1319) the ending sound to the telephone set 52 through the voice terminal IF unit 404.

Along with this processing, the call control unit 401 instructs the IP packet processing unit 406 to send the acknowledgment message to the IP telephone set 61, so that the IP packet processing unit 406 sends (S1320) the acknowledgment message to the IP telephone set 61 through the LAN IF unit 405.

The IP telephone set 61 having received that acknowledgment message extracts the notified information at the IP packet processing unit 606 through the LAN IF unit 605, and transmits the extracted information to the call control unit 601. The call control unit 601 recognizes the acknowledgment message with the notified information, and performs the releasing processing of the communication.

As has been described hereinbefore, in case the server 71 is disabled to respond by the trouble of itself or the trouble of the lines, the IP telephone set 61 performs the communication connecting procedure directly with the VoIP communication apparatus 42, if the IP telephone set 61 is the partner for which it registers the IP address by itself.

Then, the IP telephone set 61 is connected with the telephone set 52 connected with the VoIP communication apparatus 42, so that it performs the voice communication (VoIP) with the IP packet.

Here will be described a second embodiment of the present invention.

Figure 14:
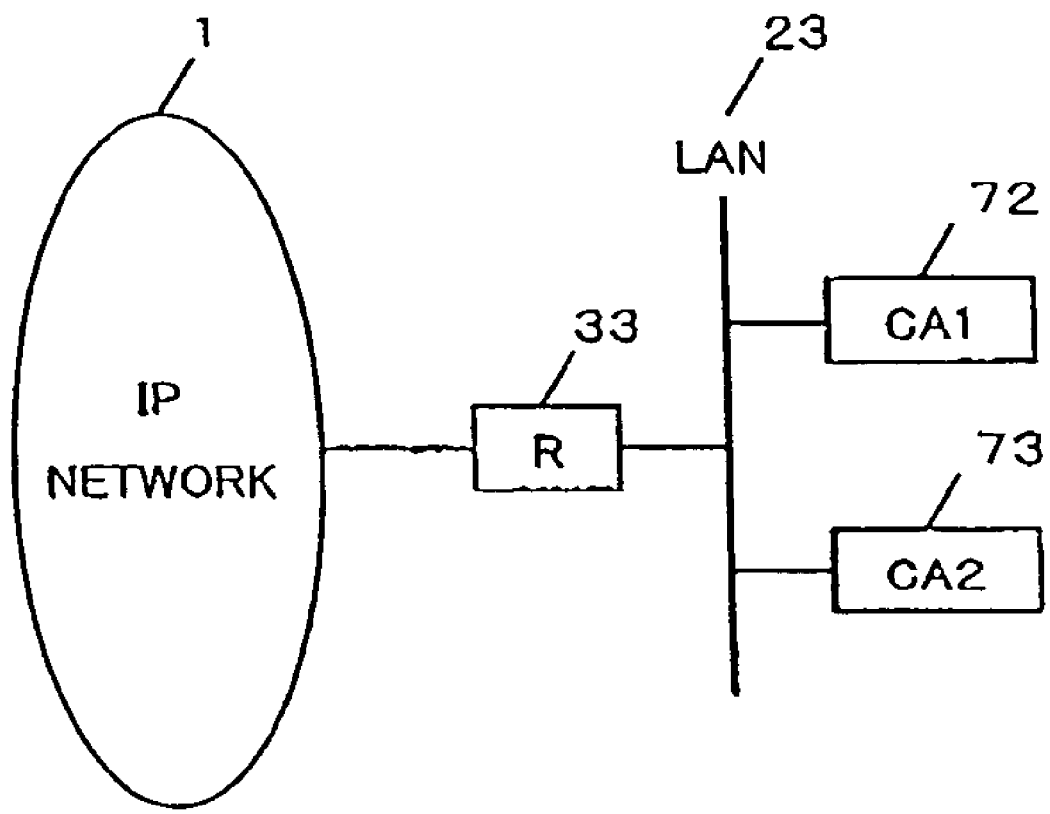
FIG. 14 is a schematic configuration diagram of a portion of a VoIP communication system, to which a second embodiment of the present invention is applied.

FIG. 14 is a schematic configuration diagram of a portion of a VoIP communication system, to which a second embodiment of the present invention is applied. FIG. 14 is a diagram showing the modified contents of the LAN 23 in the VoIP communication system shown in FIG. 1. Here, the VoIP communication system is identical to the VoIP communication system shown in FIG. 1, excepting the modifications in the configuration connected with the LAN 23, so that the description of the common portions are omitted.

In FIG. 14, servers (e.g., call agent or gate keeper) 72 and 73, which manage the VoIP communication apparatuses 41 to 46 and the IP telephone sets 61 and 62, are individually connected with the IP network 1 through the LAN 23 and the router 33.

In this configuration, the VoIP communication apparatus 4 and the IP telephone set 6 receive the IP packet which is addressed thereto and stored with the communication connection message for the voice communication, from the IP network 1 through the router 3, the LAN 2 and the server 72 or 73. Then, the call control procedure is performed by transmitting/receiving the communication connection message for the voice communications with the IP packet between the VoIP communication apparatus 4 or the transmitter of the IP packet and the IP telephone set 6. As a result, the call is connected to establish the voice communication path between the voice terminal 5 connected by itself or the IP telephone set 6 and the voice terminal 5 connected by the VoIP communication apparatus 4 of the transmitter or the IP telephone set 6. In this configuration, a plurality of servers 7 is provided for backing up their own troubles and for dispersing the loads.

Here are omitted the description of the individual configurations of the servers 72 and 73, because the configurations are identical to those shown in FIG. 8 and FIG. 9.

FIG. 15 shows the configuration of the CA storage unit 403a to be disposed in the storage unit 403 of the VoIP communication apparatus 4. According to the VoIP communication system shown in FIG. 14, the CA storage unit 403a is stored with the IP addresses 403a-2 of the plural servers 7 (i.e., the servers 72 and 73).

As shown in FIG. 1 and FIG. 14, there is a case where the telephone set 51 connected with the VoIP communication apparatus 41 transmits to the telephone set 52 connected with the VoIP communication apparatus 42 when the servers 72 and 73 are disabled to respond by the trouble of itself or the trouble of the lines. The actions of the above case will be described with reference to FIG. 16. With reference to FIG. 16, here will be described the actions of the case, in which the servers 72 and 73 are disabled to respond by the trouble of itself or the trouble of the lines, as shown in FIG. 1 and FIG. 14, and in which the telephone set 51 connected with the VoIP communication apparatus 41 transmits to the telephone set 52 connected with the VoIP communication apparatus 42.

The call control unit 401 of the VoIP communication apparatus 41 receives (S1601) the off-hook status signal of the telephone set 51 and the dial (i.e., the telephone number of the telephone set 52) through the voice terminal IF unit 404, and recognizes (S1602) the call demand. Then, the call control unit 401 transmits (S1603) the received telephone number information (Tel No 52) (i.e., the session establishment demanding message containing the selection information for specifying the communication partner) to the server 72 through the IP packet processing unit 406 and the LAN IF unit 405.

With reference to the CA storage unit 403a shown in FIG. 15, more specifically, the call control unit 401 extracts the IP address (IP Add 72 or 73) of the server 72 or 73, and demands the IP packet processing unit 406 to send the session establishment demanding message containing the received telephone number information to the destination of that IP address.

In case the CA storage unit 403a is stored with the plural servers 7, one server 7 may be arbitrarily selected. In the first extracting action, the call control unit 401 extracts the IP address (i.e., IP Add 72) of the server 72 having a high priority, and sends the session establishment demand message to the server 72.

In case the call control unit 401 does not receive any response message such as the trying message from the server 72 for predetermined time period such as 0.5 seconds, the call control unit 401 sends (S1604) again a session establishment demanding message containing the telephone number information (Tel No 52) received, to the server 72. In case the call control unit 401 does not receive the trying message from the server 72 for predetermined time period such as 1.0 second, the call control unit 401 sends (S1605) the session establishment demanding message containing the telephone number information (Tel No 52) received, to the server 72. In case the call control unit 401 does not receive the trying message from the server 72 for predetermined time period such as 2.0 seconds, the call control unit 401 sends (S1606) again the session establishment demanding message containing the telephone number information (Tel No 52) received, to the server 72.

In case no response from the server 72 is obtained even if the sending of the session establishment demanding message is tried several times (i.e., three times in the embodiment), the call control unit 401 accesses to the CA storage unit 403a (FIG. 15) in the storage unit 403 to search (S1607) whether or not another server 7 is registered.

In the embodiment, the server 73 is registered in addition to the server 72. With reference to the CA storage unit 403a shown in FIG. 15, therefore, the call control unit 401 extracts the IP address (i.e., IP Add 73) of the server 73, and requires the IP packet processing unit 406 to send the session establishment demanding message containing the received telephone number information to that IP address.

Then, the session establishment demanding message containing the received telephone number information (i.e., Tel No 52) is transmitted (S1608) to the server 73 through the IP packet processing unit 406 and the LAN IF unit 405.

Here, the timing to send the session establishment demanding message is performed, when 4.0 seconds, for example, elapses after the session establishment demanding message was sent at first to the server 72, i.e., at the instant when it is warranted that the response from the server 72 is not continued.

In case the call control unit 401 does not receive the trying message from the server 73 for predetermined time period such as 0.5 seconds, the call control unit 401 sends (S1609) again a session establishment demanding message containing the telephone number information (Tel No 52) received, to the server 73. In case the call control unit 401 does not receive the trying message from the server 73 for predetermined time period such as 1.0 second, the call control unit 401 sends (S1610) the session establishment demanding message containing the telephone number information (Tel No 52) received, to the server 73. In case the call control unit 401 does not receive the trying message from the server 73 for predetermined time period such as 2.0 seconds, the call control unit 401 sends (S1611) again the session establishment demanding message containing the telephone number information (Tel No 52) received, to the server 73.

In case no response from the server 73 is obtained even if the sending of the session establishment demanding message is tried several times, the call control unit 401 accesses to the CA storage unit 403*a* (FIG. 15) in the storage unit 403 to search (S1612) whether or not another server 7 is registered.

In the embodiment, no server 7 is present excepting the servers 72 and 73. Therefore, the call control unit 401 decides that no other server 7 is present, and accesses to the correspondence storage unit 403*b* in the storage unit 403, so that it searches (S1613) whether or not the telephone number identical to the dial (i.e., the telephone number of the telephone set 52) obtained from the telephone set 51 has been registered, thereby to extract the corresponding IP address.

As a result, in case the call control unit 401 has failed to find the telephone number identical to the dial (i.e., the telephone number of the telephone set 52) obtained from the telephone set 51, the call control unit 401 decides that the connection is impossible, and instructs the tone generation unit 402 to send the disconnectability sound (i.e., the busy tone: BT) to the telephone set 51, so that the tone generation unit 402 sends (S1614) the disconnectability sound to the telephone set 51 through the voice terminal IF unit 404.

In case the call control unit 401 finds, as a result of the search, the telephone number identical to the dial (i.e., the telephone number of the telephone set 52) obtained from the telephone set 51, on the contrary, the call control unit 401 extracts the IP address (i.e., IP Add 42) corresponding to that telephone number, and the IP packet processing unit 406 creates the IP packet having the IP address added thereto, and sends the created IP packet through the LAN IF unit 405 thereby to send (S1615) the session establishment demanding message to the VoIP communication apparatus 42.

Here, the timing to send the session establishment demanding message is performed, when 4.0 seconds, for example, elapses after the session establishment demanding message was sent at first to the server 73, i.e., at the instant when it is warranted that the response from the server 73 is not continued.

The VoIP communication apparatus 42 having received the session establishment demanding message extracts the notified information at the IP packet processing unit 406 through the LAN IF unit 405, and transmits the information to the call control unit 401. This call control unit 401 recognizes it from the notified information the message is the session establishment demanding message, and instructs the voice terminal IF unit 404 to ring the telephone set 52 so that the voice terminal IF unit 404 sends (S1616) the ringing signal to the telephone set 52.

Along with this processing, the call control unit 401 instructs the IP packet processing unit 406 to acknowledge the ringing message and to send a message notifying that the telephone set 52 is being rung, so that the IP packet processing unit 406 sends (S1617) the ringing message to the VoIP communication apparatus 41 through the LAN IF unit 405.

The VoIP communication apparatus 41 having received that ringing message extracts the notified information at the IP packet processing unit 406 through the LAN IF unit 405, and transmits the extracted information to the call control unit 401. The call control unit 401 recognizes the ringing message with the notified information, and instructs the tone generation unit 402 to output the ringing sound (i.e., the ring back tone: RBT), so that the voice terminal IF unit 404 sends (S1618) the ringing sound outputted by the tone generation unit 402, to the voice terminal 5 (or the telephone set 51).

In this state, when the operator operates the telephone set 52 in the off-hook status (S1619) to respond to the ring, a response signal is sent (S1620) from the telephone set 52 to the VoIP communication apparatus 42. This VoIP communication apparatus 42 transmits the response signal, when it receives from the voice terminal IF unit 404, to the call control unit 401. The call control unit 401 instructs, when it recognizes the response, the IP packet processing unit 406 to send the response message to the VoIP communication apparatus 41, so that the IP packet processing unit 406 sends (S1621) the response message to the VoIP communication apparatus 41 through the LAN IF unit 405.

The VoIP communication apparatus 41 having received that response message extracts the notified information at the IP packet processing unit 406 through the LAN IF unit 405, and transmits the extracted information to the call control unit 401. The call control unit 401 recognizes the response message with the notified information, and instructs the IP packet processing unit 406 to send the acknowledgment message, to the VoIP communication apparatus 42, so that the IP packet processing unit 406 sends (S1622) the acknowledgment message to the VoIP communication apparatus 42 through the LAN IF unit 405.

The communication path is established by the actions thus far described, so that the communication or the voice communication (VoIP) by the IP packet is performed between the VoIP communication apparatus 41 and the VoIP communication apparatus 42 by the RTP (Real Time Protocol). Moreover, the VoIP communication apparatus 41 and the VoIP communication apparatus 42 connect the telephone set 51 and the telephone set 52, respectively, with the IP network 1 through the voice terminal IF unit 404, the IP packet processing unit 406 and the LAN IF unit 405 thereby to establish (S1623) the communication state between the telephone set 51 and the telephone set 52.

When the communication ends so that the operator operates the telephone set 51 in the on-hook status (S1624), disconnection signal is sent (S1625) from the telephone set 51 to the VoIP communication apparatus 41. The VoIP communication apparatus 41 transmits the disconnection signal, when it receives at the voice terminal IF unit 404, to the call control unit 401. This call control unit 401 recognizes the disconnection and instructs the IP packet processing unit 406 to send the session ending message to the VoIP communication apparatus 42, so that the IP packet processing unit 406 sends (S1626) the session ending message to the VoIP communication apparatus 42 through the LAN IF unit 405.

The VoIP communication apparatus 42 having received that session ending message extracts the notified information at the IP packet processing unit 406 through the LAN IF unit 405, and transmits the extracted information to the call control unit 401. The call control unit 401 recognizes the session ending message with the notified information, and instructs the tone generation unit 402 to send the ending sound (i.e., the busy tone: BT) to the telephone set 52, so that the tone generation unit 402 sends (S1627) the ending sound to the telephone set 52 through the voice terminal IF unit 404.

Along with this processing, the call control unit 401 instructs the IP packet processing unit 406 to send the acknowledgment message to the VoIP communication apparatus 41, so that the IP packet processing unit 406 sends (S1628) the acknowledgment message to the VoIP communication apparatus 41 through the LAN IF unit 405.

The VoIP communication apparatus 41 having received that acknowledgment message extracts the notified information at the IP packet processing unit 406 through the LAN IF unit 405, and transmits the extracted information to the call control unit 401. The call control unit 401 recognizes the acknowledgment message with the notified information, and performs the releasing processing of the communication.

As has been described hereinbefore, in case both the servers 72 and 73 (or all the servers) are disabled to respond by the trouble of themselves or the trouble of the lines, the VoIP communication apparatus 41 performs the communication connecting procedure directly with the VoIP communication apparatus 42, if the VoIP communication apparatus 41 is the partner for which it registers the VoIP address by itself then, the telephone set 51 connected with the VoIP communication apparatus 41 is connected with the telephone set 52 which is connected with the VoIP communication apparatus 42, so that it performs the voice communication (VoIP) with the IP packet.

What is claimed is:

1. A communication apparatus having a function to execute a call controlling procedure for voice communications using a computer communication network with a communication partner apparatus by using a server connected with said computer communication network, comprising;
   a correspondence storage means configured to store corresponding relations between a communication address of said communication partner apparatus and selection information of said communication partner apparatus; and
   a call controller configured to receive said selection information of said communication partner apparatus from a call-initiate, and configured to request a communication connection with said communication partner apparatus using a communication address of said server, and configured to process a communication connection with said communication partner apparatus by using said server,
   wherein said call controller is configured to acquire from said server said communication connection demanded by said call-initiate, but if no response is obtained from said server, then if said selection information received from said call-initiate is stored in said correspondence storage means, said call controller is configured to obtain from said correspondence storage means a communication address of said communication partner apparatus corresponding to said selection information, and said call controller is configured to request a communication connection to said communication address of said communication partner apparatus using said communication address obtained from said correspondence storage means.

2. A communication apparatus according to claim 1, wherein,
   said call controller is configured to output a signal indicating a failure to connect if said correspondence storage means does not have said selection information in storage.

3. A communication apparatus according to claim 1, wherein,
   said call controller is configured to select one of a plurality of said communication addresses, if any, of said communication partner apparatus corresponding to said selection information in said correspondence storage means, and said call controller is configured to request a communication connection to said selected communication address.

4. A communication apparatus according to claim 3, wherein,
   said call controller is configured to select one of a plurality of said communication addresses, if any, of said communication partner apparatus corresponding to said selection information in said correspondence storage means, and said call controller is configured to request a communication connection to said selected communication address, and if said call controller detects a failure to connect, said call controller is configured to iteratively select another corresponding communication address and said call controller is configured to request a communication connection to said another corresponding communication address, until all corresponding communication addresses have been tried.

5. A communication apparatus according to claim 1, wherein,
   if a plurality of said servers are present, said call controller is configured to acquire said communication address of said communication partner apparatus corresponding to said selection information stored in said correspondence storage means, and said call controller is configured to sequentially demand a communication connection to each of said plural servers, but if no response is obtained from all of said plural servers, said call controller is configured to request a communication connection to said communication address.

6. A communication method for executing a call controlling procedure in a communications apparatus, for voice communications using a computer communication network with a communication partner apparatus by using a server connected with said computer communication network, comprising;
   storing, in a correspondence storage means in said communications apparatus, corresponding relations between a communication address of said communication partner apparatus and selection information of said communication partner apparatus; and
   receiving, in a call controller in said communications apparatus, said selection information of said communication partner apparatus from a call-initiate; and
   requesting a communication connection with said communication partner apparatus using a communication address of said server; and
   processing a communication connection with said communication partner apparatus by using said server,
   wherein said call controller acquires from said server the communication connection demanded by said call-initiate, but if no response is obtained from said server, then if said selection information received from said call-initiate is stored in said correspondence storage means, said call controller obtains from said correspondence storage means a communication address of said communication partner apparatus corresponding to said selection information, and requests a communication connection to said communication address of said communication partner apparatus using said communication address obtained from said correspondence storage means.

7. A communication method according to claim 6, wherein, outputting, from said call controller, a signal indicating a failure to connect if said correspondence storage means does not have said selection information in storage.

8. A communication method according to claim 6, wherein,
    selecting, with said call controller, one of a plurality of said communication addresses, if any, of said communication partner apparatus corresponding to said selection information in said correspondence storage means; and
    requesting a communication connection to said selected communication address.

9. A communication method according to claim 8, wherein,
    selecting, with said call controller, one of a plurality of said communication addresses, if any, of said communication partner apparatus corresponding to said selection information in said correspondence storage means; and
    requesting a communication connection to said selected communication address, and if the call controller detects a failure to connect, to iteratively select another corresponding communication address and to request a communication connection to said another corresponding communication address, until all corresponding communication addresses have been tried.

10. A communication method according to claim 6, wherein,
    if a plurality of said servers are present, acquiring with said call controller said communication address of said communication partner apparatus corresponding to said selection information stored in said correspondence storage means; and
    sequentially demanding a communication connection to each of said plural servers, but if no response is obtained from all of said plural servers, and requesting a communication connection to said communication address.

* * * * *